US011325473B2

(12) United States Patent
Kim et al.

(10) Patent No.: US 11,325,473 B2
(45) Date of Patent: May 10, 2022

(54) ELECTRONIC DEVICE INCLUDING DISPLAY AND OPERATING METHOD THEREOF

(71) Applicant: Samsung Electronics Co., Ltd., Gyeonggi-do (KR)

(72) Inventors: Dohyoung Kim, Gyeonggi-do (KR); Changyoul Lee, Gyeonggi-do (KR); Kwaneui Hong, Gyeonggi-do (KR); Byunghoon Min, Gyeonggi-do (KR); Deokyeol Lee, Gyeonggi-do (KR); Yongjun Lim, Gyeonggi-do (KR); Jaemo Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/132,261

(22) Filed: Dec. 23, 2020

(65) Prior Publication Data
US 2021/0188090 A1    Jun. 24, 2021

(30) Foreign Application Priority Data

Dec. 24, 2019  (KR) .......................... 10-2019-0174555

(51) Int. Cl.
*B60K 37/02*  (2006.01)
*G06F 3/0488*  (2022.01)

(52) U.S. Cl.
CPC ............ *B60K 37/02* (2013.01); *G06F 3/0488* (2013.01); *B60K 2370/122* (2019.05);
(Continued)

(58) Field of Classification Search
CPC ............ B60K 37/02; B60K 2370/1523; B60K 2370/122; B60K 2370/126; B60K 2370/1442; G06F 3/0488
See application file for complete search history.

(56) References Cited

U.S. PATENT DOCUMENTS 6,719,343 B2 *  4/2004  Emerling .............. B60N 3/101
                                               296/24.34
7,168,749 B2 *  1/2007  Schmidt .................. B60R 7/06
                                               296/24.34
(Continued)

FOREIGN PATENT DOCUMENTS

JP   2001-280979   10/2001
JP      3719692    11/2005
(Continued)

OTHER PUBLICATIONS

International Search Report dated Apr. 9, 2021 issued in counterpart application No. PCT/KR2020/018865, 7 pages.

*Primary Examiner* — Christopher E Leiby
(74) *Attorney, Agent, or Firm* — The Farrell Law Firm, P.C.

(57) ABSTRACT

An electronic device is provided. The electronic device includes a first device including a first housing having a first surface and a second surface facing opposite to the first surface, and a first display disposed in the first housing and visually exposed through the first surface, a second device including a second housing having a third surface, and a second display disposed in the second housing and visually exposed through the third surface, an assembly connecting the first device and the second device, a processor and a memory that stores instructions that, when executed, cause the processor to control the assembly so that the second surface faces the third surface and covers the second display in a first state, and control the assembly so that the second surface does not cover the second display in a second state.

20 Claims, 36 Drawing Sheets

(52) U.S. Cl.
CPC ............... *B60K 2370/126* (2019.05); *B60K 2370/1442* (2019.05); *B60K 2370/1523* (2019.05)

(56) References Cited

U.S. PATENT DOCUMENTS

| | | | | |
|---|---|---|---|---|
| 7,412,258 B1* | 8/2008 | Lipponen | ............... | G06F 1/1616 455/550.1 |
| 7,561,146 B1* | 7/2009 | Hotelling | ............... | G06F 3/042 345/175 |
| 8,150,482 B2* | 4/2012 | Matsuoka | ........... | H04M 1/0235 455/575.4 |
| 8,206,047 B1* | 6/2012 | Isaac | .................. | G06F 3/0393 400/491 |
| 8,666,463 B2* | 3/2014 | Yoon | ................... | H04M 1/0235 455/575.4 |
| 9,731,602 B2* | 8/2017 | Kim | .................... | G09G 5/14 |
| 10,198,172 B2* | 2/2019 | Choi | ................... | G06F 3/0393 |
| 10,556,507 B2 | 2/2020 | Park et al. | | |
| 10,921,912 B2* | 2/2021 | Kumar | ............... | G06F 3/0393 |
| 2004/0056781 A1* | 3/2004 | Rix | .................... | G06F 3/0238 341/20 |
| 2006/0109197 A1* | 5/2006 | Kuwabara | ............ | B60K 35/00 345/1.1 |
| 2006/0164230 A1* | 7/2006 | DeWind | ................ | B60K 35/00 340/461 |
| 2007/0206349 A1* | 9/2007 | Jacobs | ................. | G06F 1/1681 361/679.05 |
| 2007/0254730 A1* | 11/2007 | Kim | ................... | H04M 1/0241 455/575.4 |
| 2008/0106859 A1* | 5/2008 | Eguchi | ............... | B60R 11/0264 361/679.21 |
| 2008/0211779 A1* | 9/2008 | Pryor | ................ | G06F 3/04847 345/173 |
| 2009/0176542 A1* | 7/2009 | Matsuoka | ........... | H04M 1/0235 455/575.4 |
| 2010/0222116 A1* | 9/2010 | Burbidge | ............. | H04M 1/0235 455/575.4 |
| 2011/0166748 A1 | 7/2011 | Schneider et al. | | |
| 2012/0162879 A1* | 6/2012 | Totsuka | ................ | G06F 1/1681 361/679.01 |
| 2012/0188395 A1* | 7/2012 | Barber | .................... | G11B 27/34 348/222.1 |
| 2013/0134730 A1* | 5/2013 | Ricci | ....................... | G06F 16/24 296/24.34 |
| 2013/0147847 A1* | 6/2013 | Koseki | ............... | B60R 11/0235 345/660 |
| 2014/0111540 A1* | 4/2014 | Morimoto | ............... | G06T 11/20 345/619 |
| 2014/0350784 A1* | 11/2014 | Imai | ....................... | G06F 3/041 701/36 |
| 2014/0362347 A1* | 12/2014 | Oel | ......................... | G06F 3/017 353/13 |
| 2016/0193923 A1 | 7/2016 | Kim et al. | | |
| 2017/0277178 A1* | 9/2017 | Kimura | ................... | G05B 9/02 |
| 2017/0313192 A1* | 11/2017 | Segawa | ................... | B60R 11/02 |
| 2017/0351422 A1* | 12/2017 | Wild | ........................ | G06F 3/14 |
| 2017/0371429 A1 | 12/2017 | Tsai et al. | | |
| 2018/0201204 A1* | 7/2018 | Saitou | ................ | G02B 27/0101 |
| 2018/0373350 A1* | 12/2018 | Rao | ........................ | B60K 35/00 |
| 2019/0227598 A1* | 7/2019 | Miele | ..................... | G06F 1/1647 |
| 2019/0386887 A1* | 12/2019 | Ricci | ........................ | B60W 40/04 |
| 2020/0371733 A1* | 11/2020 | Rao | ......................... | G06F 3/1423 |
| 2021/0181796 A1* | 6/2021 | Delaporte | ............. | G06F 1/1641 |

FOREIGN PATENT DOCUMENTS

| | | |
|---|---|---|
| JP | 2016-147528 | 8/2016 |
| KR | 1020160096580 | 8/2016 |
| KR | 10-1821053 | 3/2018 |
| KR | 1020180064968 | 6/2018 |

* cited by examiner

ELECTRONIC DEVICE INCLUDING DISPLAY AND OPERATING METHOD THEREOF

CROSS-REFERENCE TO RELATED APPLICATION(S)

This application is based on and claims priority under 35 U.S.C. § 119 to Korean Patent Application No. 10-2019-0174555, filed on Dec. 24, 2019, in the Korean Intellectual Property Office, the entire disclosure of which is incorporated herein by reference.

BACKGROUND

1. Field

The present disclosure relates generally to an electronic device including a display and an operating method thereof.

2. Description of Related Art

Vehicles continue to evolve as more convenient and human-friendly advanced features emerge. Recently, there is high interest in connected cars that maximize driver's convenience and safety through active connectivity and communication with internal and external environments. Known as one of technologies for implementing the connected car is an in-vehicle infotainment (IVI) system that not only provides information such as navigation, audio, and video, but also offers and controls entertainment functions. As consumer's needs change according to the popularization of portable devices such as smartphones or tablet personal computer (PCs) and also autonomous driving technologies are dramatically developed, the IVI system is drawing attention from consumers.

The IVI system may include, for example, a touch interface-based vehicle display (also referred to as an auto display, a center information display (CID), etc.). However, the touch interface-based vehicle display merely provides a function that does not interfere with the driver's driving, and has a limitation in providing a satisfactory user experience depending on driver's situations.

Various embodiments of the disclosure are directed to providing an electronic device, including a display, and an operating method thereof capable of improving a user experience (UX) or a user interface (UI) depending on driver's situations

SUMMARY

The present disclosure has been made to address at least the disadvantages described above and to provide at least the advantages described below.

In accordance with an aspect of the present disclosure, an electronic device is provided. The electronic device includes a first device including a first housing having a first surface and a second surface facing opposite to the first surface, and a first display disposed in the first housing and visually exposed through the first surface, a second device including a second housing having a third surface, and a second display disposed in the second housing and visually exposed through the third surface, an assembly connecting the first device and the second device, a processor operatively connected to the first device, the second device, and the assembly, and a memory electrically connected to the processor. The memory stores instructions that, when executed, cause the processor to control the assembly so that the second surface faces the third surface and covers the second display in a first state, and control the assembly so that the second surface does not cover the second display in a second state.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
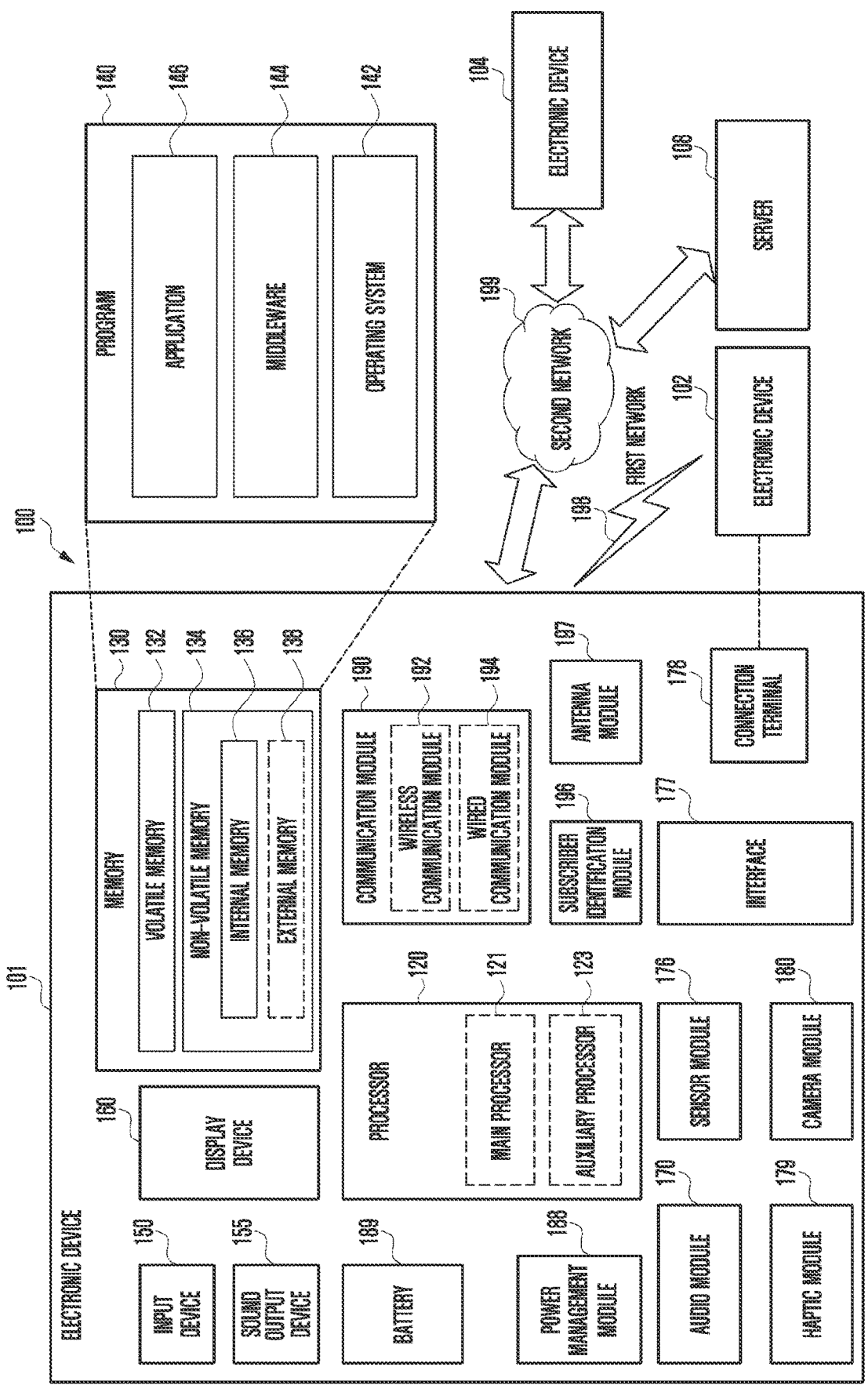
FIG. 1 illustrates an electronic device in a network environment, according to an embodiment.

FIG. 1 illustrates an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
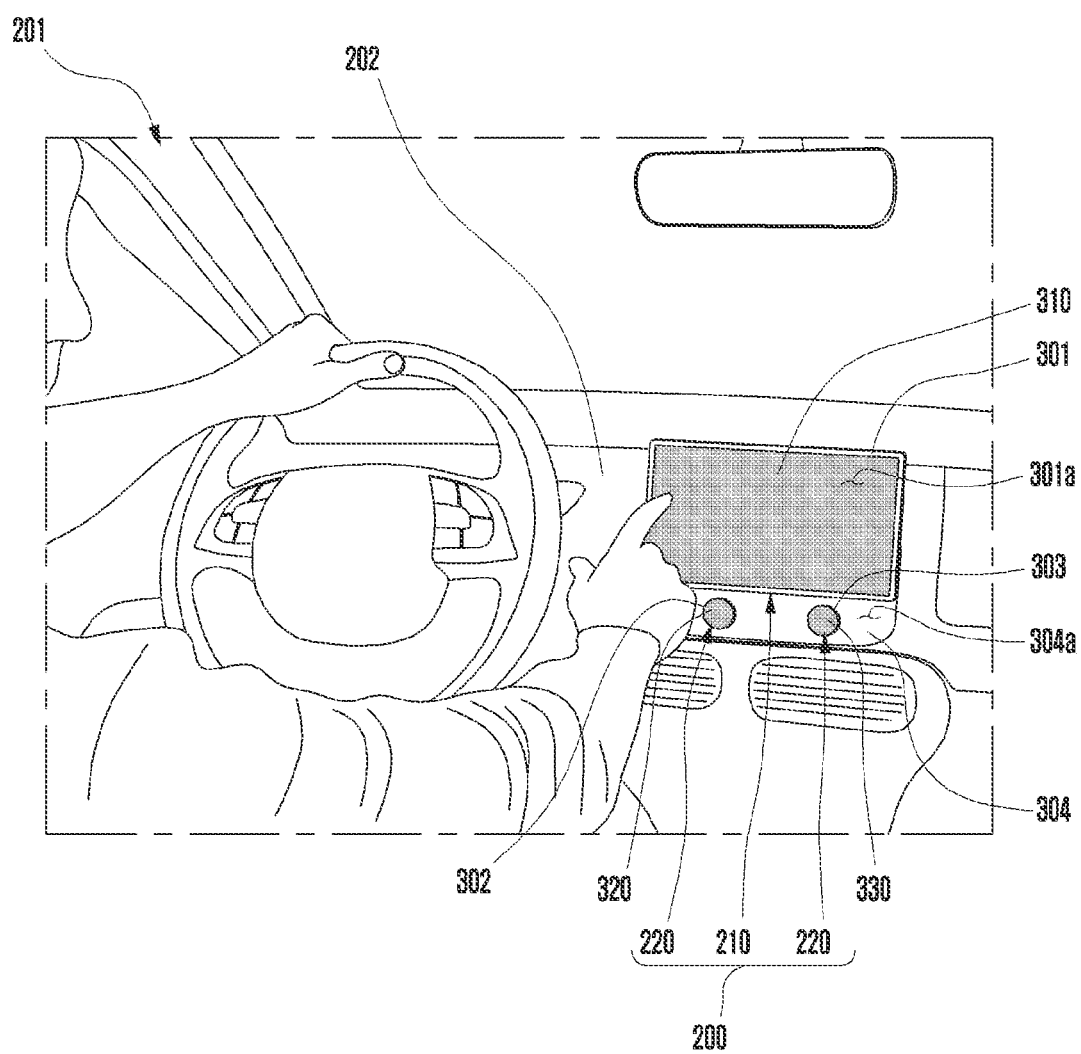
FIG. 2 illustrates an electronic device in a vehicle environment, according to an embodiment.

FIG. 2 illustrates an electronic device 200 in a vehicle environment, according to an embodiment.

Referring to FIG. 2, in an embodiment, the electronic device 200 may be located on a dashboard 202 in a vehicle 201. The dashboard 202 may refer to a panel having various instruments in front of a driver's seat and a passenger's seat. The electronic device 200 may include a first device (or a first electronic device) 210, a second device (or a second electronic device) 220, and/or a third device (or a third electronic device) 230. The electronic device 200 is not limited to the embodiment shown in FIG. 2 and may be located in any other place in the vehicle 201. The electronic device 200 may be located in various places other than the vehicle 201.

According to an embodiment, the first device 210 may include a first housing 301 and a first display 310 disposed in the first housing 301. The first display 310 may be implemented based on various kinds of light-emitting devices such as, for example, an organic light-emitting diode (OLED). The first housing 301 may have a first surface 301a, a second surface opposite to the first surface 301a, and a lateral surface surrounding at least partially a space between the first surface 301a and the second surface. In a certain embodiment, the first housing 301 may refer to a structure forming at least a part of the first surface 301a, the second surface, and/or the lateral surface. At least a part of the first housing 301 may be formed by coated or colored glass, ceramic, polymer, metal (e.g., aluminum, stainless steel (STS), or magnesium), or a combination thereof. The first surface 301a may substantially face the rear of the vehicle 201. The first display 310 may be visually exposed through the first surface 301a. For example, the first housing 301 may include a transparent plate forming at least a part of the first surface 301a, and the first display 310 may be disposed in the first housing 301 to correspond to the transparent plate at least in part.

According to various embodiments, the first display 310 may further include a first touch sensing circuit (e.g., a touch sensor). The first touch sensing circuit may be implemented as a transparent conductive layer (or film) based on various conductive materials such as indium tin oxide (ITO). In one example (referred to as an on-cell type), the first touch sensing circuit may be disposed between an optical layer (e.g., a layer for improving an image quality or outdoor visibility, such as a polarization layer) of the first display 310 and a light-emitting layer (e.g., a layer including a plurality of pixels implemented as a light-emitting device such as OLED, and at least one thin film transistor (TFT) controlling the pixels) of the first display 310. In another example (referred to as an add-on type), the first touch sensing circuit may be disposed between the first surface 301a and the optical layer (e.g., the polarization layer). In still another example (referred to as an in-cell type), the light-emitting layer may include a touch sensing circuit or a touch sensing function.

According to a certain embodiment, the first display 310 may further include a pressure sensor capable of measuring the intensity (or pressure) of a touch input.

According to a certain embodiment, the first device 210 may further include a digitizer disposed within the first housing 301. The digitizer is capable of detecting a stylus pen of magnetic field type. The first display 310 may be combined with or disposed adjacent to the digitizer.

According to a certain embodiment, the first device 210 may further include any input device other than the first touch sensing circuit, the pressure sensor, or the digitizer. The first device 210 may include at least one key button positioned on the lateral surface of the first housing 301. In a certain embodiment, the first device 210 may include various user input detection elements such as an ultrasonic sensor, an optical sensor, or a strain gauge.

According to a certain embodiment, the first display 310 may be implemented as a flexible display based on a substrate (e.g., a plastic substrate) formed of a flexible material such as polyimide (PI). In this case, the first surface 301a and the first display 310 conforming the first surface 301a are not limited to a flat shape, and may be implemented in various other shapes such as a curved surface.

According to a certain embodiment, the first device 210 may further include various other elements disposed in the first housing 301. The first device 210 may include at least some of the components of the electronic device 101 shown in FIG. 1. The first device 210 may be a center information display (CID).

According to an embodiment, the electronic device 200 may include a fourth housing 304 combined with the dashboard 202 of the vehicle 201. For example, the fourth housing 304 may be inserted into a recess (or opening) formed in the dashboard 202 of the vehicle 201. The fourth housing 304 may have a third surface 304a facing substantially the rear of the vehicle 201. In a certain embodiment, the fourth housing 304 may be integrally formed with the dashboard 202, and may have the same material as that of the dashboard 202. FIG. 2 illustrates a case where the electronic device 200 is in a second mode (a second state). The fourth housing 304 may have a first opening and a second opening, both of which are formed in the third surface 304a. In the second mode, the first device 210 may be positioned so as not to obscure the first opening and the second opening. In the second mode, the second device 220 may be disposed to protrude from the third surface 304a through the first opening. In the second mode, the third device 230 may be disposed to protrude from the third surface 304a through the second opening. In a certain embodiment, in a first mode (or a first state) of the electronic device 200, the first device 210 may be positioned to cover the first and second openings formed in the third surface 304a. In the first mode, the second device 220 and the third device 230 may be positioned so as not to protrude from the third surface 304a.

According to an embodiment, the second device 220 may include a second housing 302 and a second display 320 disposed in the second housing 302. The second housing 302 may be formed of various materials such as a polymer or a metal. The second display 320 may be implemented based on various kinds of light-emitting devices such as an OLED. The second housing 302 may have a fourth surface substantially facing the rear of the vehicle 201 or the same direction as the third surface 304a faces, and the second display 320 may be disposed on the fourth surface. In a certain embodiment, the second display 320 may be implemented as a flexible display based on a substrate (e.g., a plastic substrate) formed of a flexible material such as polyimide. In this case, the fourth surface and the second display 320 conforming the fourth surface are not limited to a flat shape, and may be implemented in various other shapes such as a curved surface. In a certain embodiment, the second housing 302 may include a transparent plate forming at least a part of the fourth surface, and the second display 320 may be disposed in the second housing 302 to correspond to the transparent plate at least in part. When the electronic device 200 is changed from the first mode to the second mode, the second display 320 may be exposed because of the movement of the first device 210. In addition, when the electronic device 200 is changed from the first mode to the second mode, the second display 320 disposed in the second housing 302 may protrude from the third surface 304a of the fourth housing 304 through the first opening formed in the third surface 304a. On the other hand, when the electronic device 200 is changed from the second mode to the first mode, the second display 320 disposed in the second housing 302 may not protrude from the third surface 304a of the fourth housing 304. In addition, when the electronic device 200 is changed from the second mode to the first mode, the second display 320 may be covered with the first device 210 because of the movement of the first device 210.

According to an embodiment, the second display 320 may include a second touch sensing circuit (e.g., a touch sensor). The second touch sensing circuit may be implemented in the same manner as the first touch sensing circuit included in the first display 310, so that a detailed description thereof will be omitted. In a certain embodiment, the second display 320 may further include a pressure sensor capable of measuring the intensity (or pressure) of a touch input.

According to an embodiment, the third device 230 may include a third housing 303 and a third display 330 disposed in the third housing 303. The third device 230 may be implemented in substantially the same manner as the second device 220, so that a description thereof will be omitted. When the electronic device 200 is changed from the first mode to the second mode, the third display 330 may be exposed because of the movement of the first device 210. In addition, when the electronic device 200 is changed from the first mode to the second mode, the third display 330 disposed in the third housing 303 may protrude from the third surface 304a of the fourth housing 304 through the second opening formed in the third surface 304a. On the other hand, when the electronic device 200 is changed from the second mode to the first mode, the third display 330 disposed in the third housing 303 may not protrude from the third surface 304a of the fourth housing 304. In addition, when the electronic device 200 is changed from the second mode to the first mode, the third display 330 may be covered with the first device 210 because of the movement of the first device 210.

According to a certain embodiment, the first display 310, the second display 320, or the third display 330 may further include various components depending on its implementation type. In addition, such components or their equivalents may be modified in various forms according to the convergence trend of the display. In addition, some of the above-described components of the display may be excluded or replaced with other similar components.

According to a certain embodiment, the second device 220 may further include any input device other than the second touch sensing circuit included in the second display 320. Such as input device may include an actuator and a signal generating element functionally or operatively coupled to the actuator. The signal generating element may generate an electrical signal in response to a movement (e.g., a translational motion, a rotational motion, etc.) of the actuator caused by an external force. The actuator may be connected to the second housing 302. When the second housing 302 is moved by an external force, the actuator connected to the second housing 302 may also move.

According to an embodiment, the signal generating element may be a push button switch. The push button switch may have a first contact and a second contact. When the second housing 302 is pressed by an external force, the push button switch may be pressed by the actuator, and thus the first and second contacts may come into close contact with and be electrically connected to each other. An input device based on the push button switch may be referred to as a push button.

According to a certain embodiment, the signal generating element may be a rotary switch. The rotary switch may have a plurality of first contacts arranged in a circular shape, a second contact, and a shaft connected to the second contact. When the shaft of the rotary switch is rotated, the second contact may be electrically connected to one of the plurality of first contacts. When the second housing 302 is rotated by an external force, the shaft may be rotated by the actuator, and thus the second contact may be electrically connected to one of the plurality of first contacts. In order to enable the rotation of the second housing 302, the second housing 302, and the first opening of the fourth housing 304 corresponding to the second housing 302 may each be formed in a circular shape when viewed from above the fourth surface 304a. Also, when viewed from above the fourth surface 304a, the second display 320 disposed in the second housing 302 may be circular and thus referred to as a round display. An input device based on the rotary switch may be referred to as a rotary button.

According to a certain embodiment, the push button switch and the rotary switch are exemplary only, and various signal generating elements such as a sensor capable of generating an electrical signal in response to an actuator movement (e.g., a translational motion, a rotational motion, etc.) may be used. For example, an input device applicable to the second device 220 may include a magnet and a Hall sensor. The magnet may be disposed on the actuator. When the actuator is rotated by an external force and thereby the magnet becomes close to the Hall sensor disposed near the actuator, the Hall sensor may output an electrical signal.

According to a certain embodiment, like a joystick, an input device applicable to the second device 220 may be designed to selectively generate an electrical signal depending on a tilted direction or angle of the actuator. In this case, the actuator may be implemented such that one end thereof can be tilted in various directions around the other end located inside the second device 220. The input device may include a switch that outputs an electrical signal depending on a direction or angle of the actuator tilted by an external force.

According to various embodiments, an input device applicable to the second device 220 may be implemented to include various detection elements such as a pressure sensor, a touch sensor, an ultrasonic sensor, an optical sensor, or a strain gauge.

According to a certain embodiment, the third device 230 may further include an input device implemented in substantially the same manner as the input device included in the second device 220.

According to a certain embodiment, the electronic device 200 is not limited to the embodiment of FIG. 2 and may be implemented by varying the number of devices such as the second device 220.

According to a certain embodiment, the second device 220 or the third device 230 may be referred to as a knob. The second device 220 or the third device 230 that can be covered with the first device 210 in the first mode may be referred to as a hidden knob.

Figure 3A:
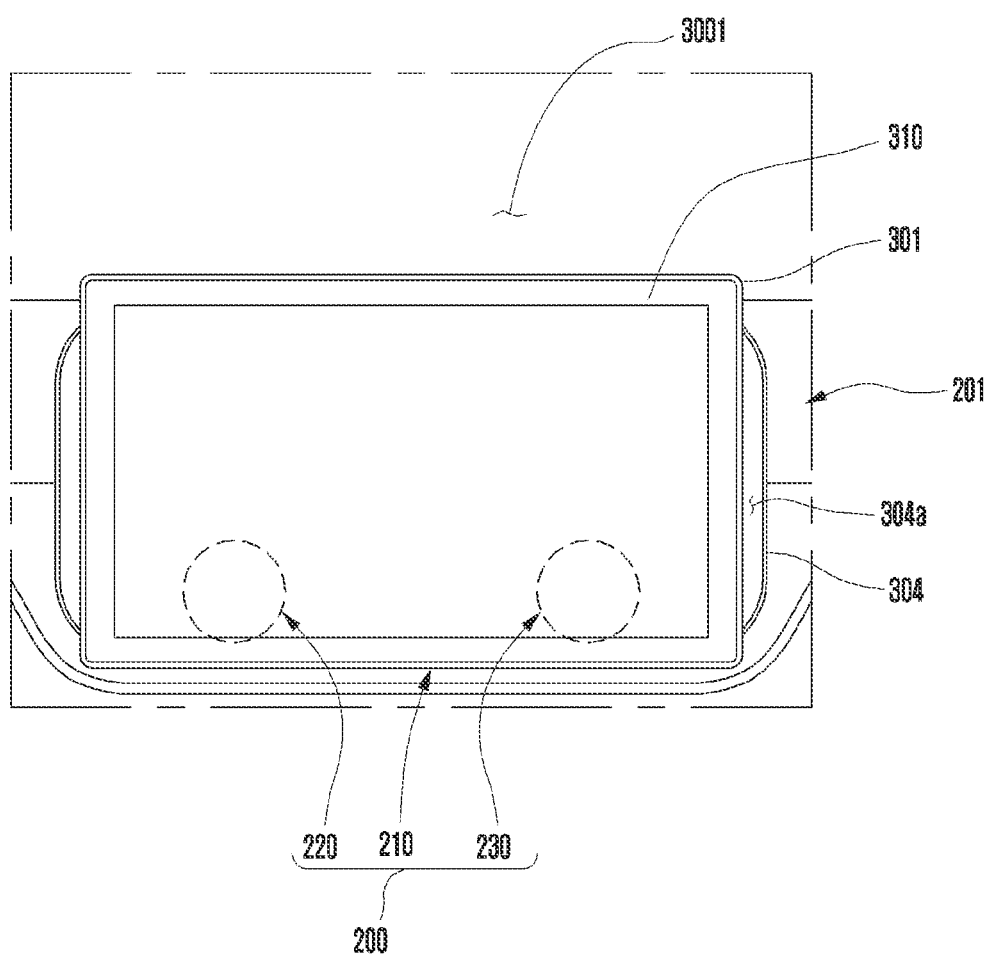
FIGS. 3A, 3B, and 3C illustrate various modes of an electronic device, according to an embodiment.
Figure 3B:
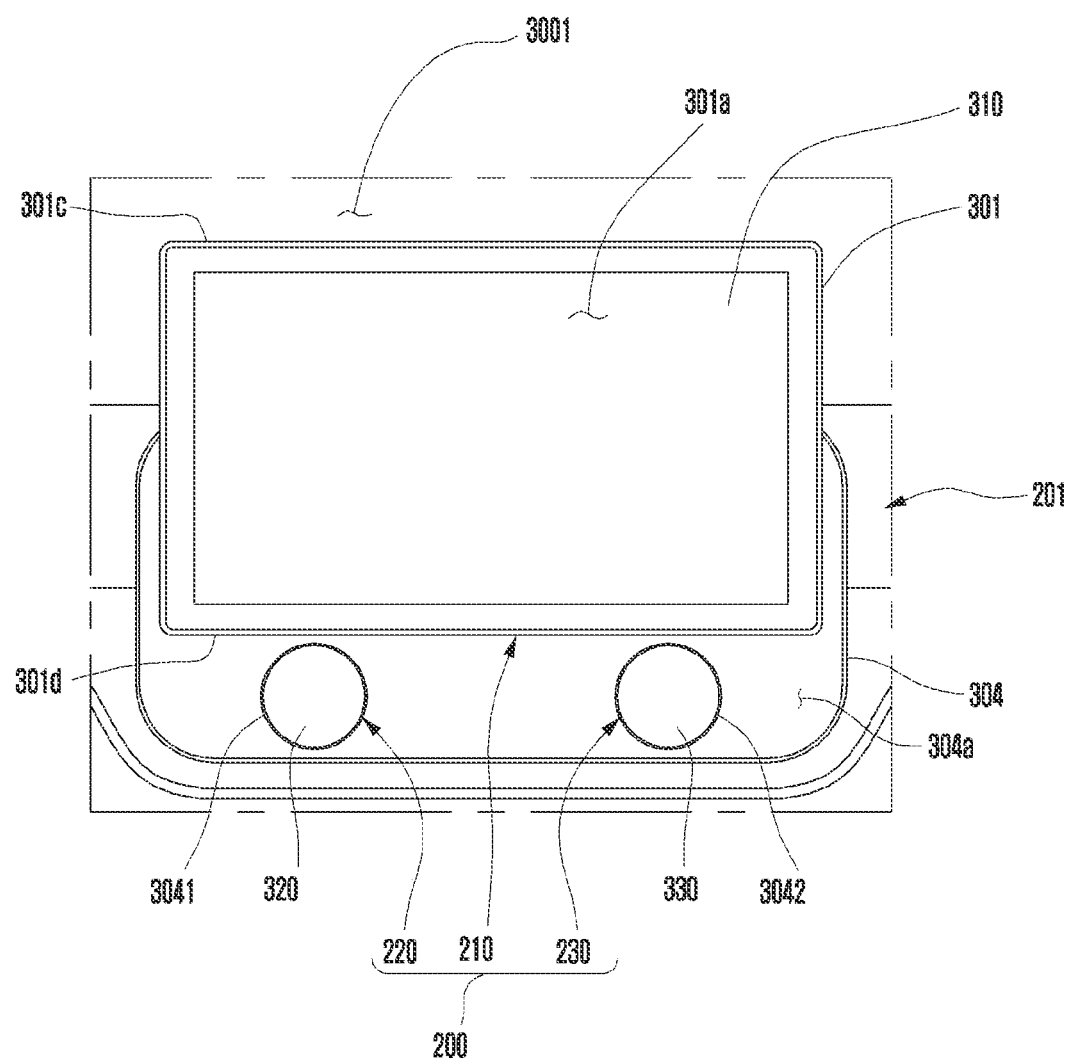
Figure 3C:
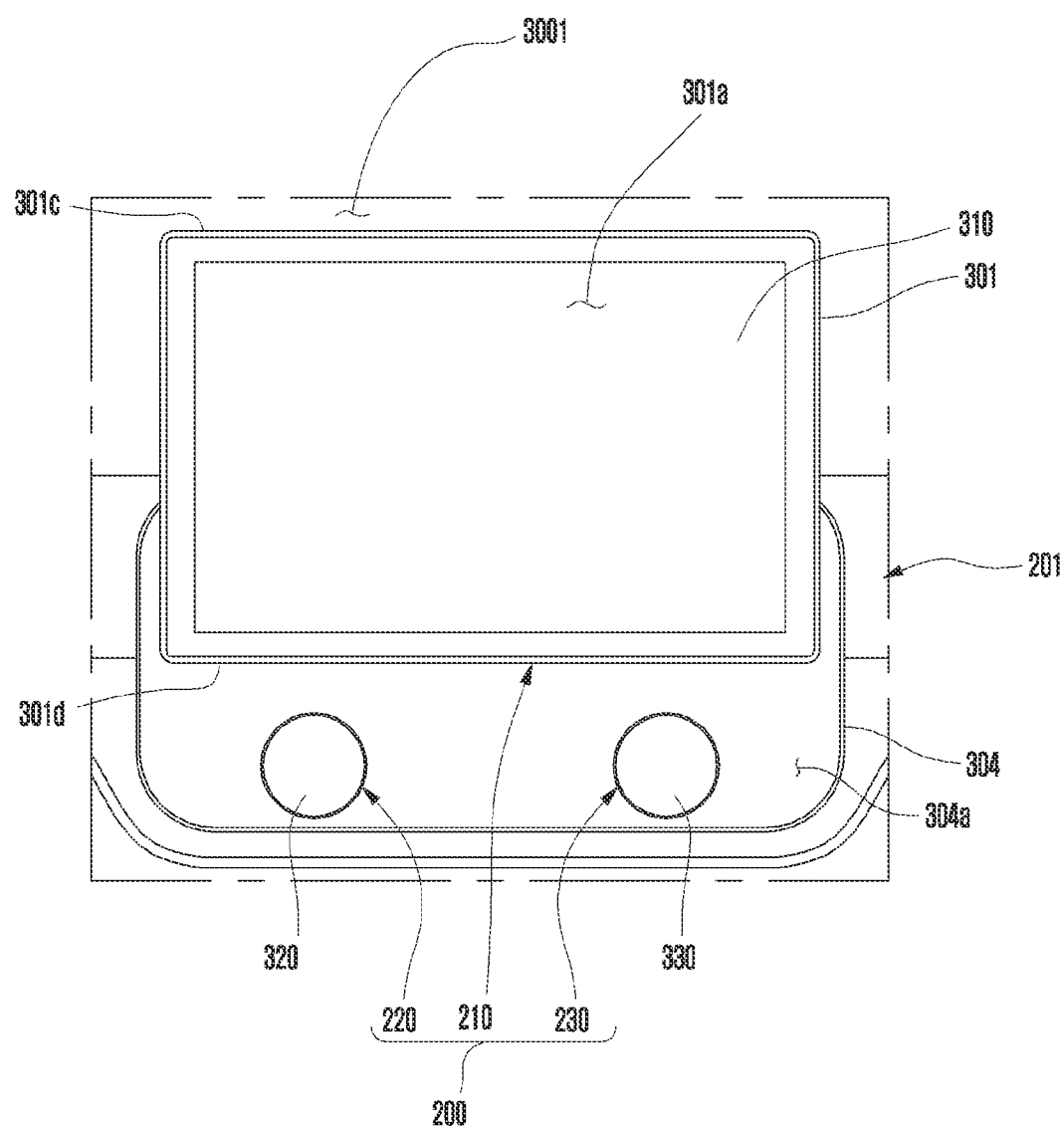

FIGS. 3A, 3B, and 3C illustrate various modes of the electronic device 200, according to an embodiment.

FIGS. 3A, 3B, and 3C depict the electronic device 200 when looking toward the third surface 304a of the fourth housing 304.

Referring to FIG. 3A, according to an embodiment, the first device 210 may be positioned to cover the second device 220 and the third device 230 in the first mode. The first mode refers to a state where the first housing 301 maximally covers the third surface 304a of the fourth housing 304 when looking toward the third surface 304a of the fourth housing 304. In the first mode, the electronic device 200 may output an image through the first display 310 of the first device 210. Also, in the first mode, the electronic device 200 may perform at least one operation related to the electronic device 200 or the vehicle 201, based on, at least in part, a user input (e.g., a touch input or a hovering input) detected through the touch sensing circuit included in the first display 310. In a certain embodiment, in the first mode, the electronic device 200 may cause the second device 220 or the third device 230 to be in a disabled state.

Referring to FIG. 3B, in an embodiment, the first device 210 may be positioned so as not to cover the second device 220 and the third device 230 in the second mode. In the second mode, the second device 220 may be disposed to protrude from the third surface 304a of the fourth housing 304 through a first opening 3041 formed in the third surface 304a. Similarly, in the second mode, the third device 230 may be disposed to protrude from the third surface 304a of the fourth housing 304 through a second opening 3042 formed in the third surface 304a. In the second mode, the electronic device 200 may output an image through the first display 310 of the first device 210, the second display 320 of the second device 220, or the third display 330 of the third device 230. Also, in the second mode, the electronic device 200 may perform at least one operation related to the electronic device 200 or the vehicle 201, based on, at least in part, a user input detected through an input device included in the first device 210, an input device included in the second device 220, or an input device included in the third device 230.

According to an embodiment, the electronic device 200 may change from the second mode shown in FIG. 3B to the third mode (or third state) shown in FIG. 3C. When the electronic device 200 changes from the second mode to the third mode, the first device 210 may be tilted at a predetermined angle. Referring to FIGS. 3B and 3C, the first surface 301a may be substantially rectangular, such as having a first edge 301c and a second edge 301d parallel with each other. In the second mode (FIG. 3B) or the third mode (FIG. 3C), the second edge 301d may be positioned between the first edge 301c and the second device 220 (or the third device 230) when looking toward the third surface 304a of the fourth housing 304. In the third mode, the first surface 301a of the first housing 301 and the third surface 304a of the fourth housing 304 may have a larger angle than in the second mode. When the second mode is changed to the third mode, the second edge 301d may also change in position because of tilting of the first device 210, and a portion of the third surface 304a of the fourth housing 304 that is exposed to the outside may become larger when looking toward the third surface 304a. In the third mode, the electronic device 200 may output an image through the first display 310 of the first device 210, the second display 320 of the second device 220, or the third display 330 of the third device 230. Also, in the third mode, the electronic device 200 may perform at least one operation related to the electronic device 200 or the vehicle 201, based on, at least in part, a user input detected through an input device included in the first device 210, an input device included in the second device 220, or an input device included in the third device 230.

According to an embodiment, compared to the first mode (FIG. 3A), the second mode (FIG. 3B) or the third mode (FIG. 3C) allows the driver to use the second device 220 and the third device 230 each of which can be more easily manipulated than the first device 210. Thus, the second mode and the third mode may be defined as modes considering the driver's safety in comparison with the first mode.

According to an embodiment, the degree of tilt of the first surface 301a is different in the second mode and the third mode, and the second mode may facilitate a touch input through the first display 310 than the third mode. Thus, the second mode may be defined as a mode in consideration of both the driver's safety and the easy touch input through the first display 310. The degree of tilt of the first surface 301a is different in the second mode and the third mode, and the third mode may reduce visual discomfort for the first display 310 than the second mode. Thus, the third mode may be defined as a mode in consideration of both the driver's safety and the visual comfort for the first display 310.

According to various embodiments, the vehicle 201 may include a display 3001. In the first mode, the first device 210 may not substantially cover the display 3001 of the vehicle 201 when looking toward the third surface 304a. In the second mode or the third mode, the first device 210 may partially cover the display 3001 of the vehicle 201 when looking toward the third surface 304a. While content is displayed through the display 3001 of the vehicle 201, a change between the first and second modes or between the second and third modes may occur at the electronic device 200. In this case, the mode change may cause an area where content is displayed on the display 3001 of the vehicle 201 to change. For example, in the first mode of the electronic device 200, content may be displayed through the entire area of the display 3001 of the vehicle 201. In the second mode or the third mode of the electronic device 200, content may be displayed through a partial area of the display 3001 of the vehicle 201 that is not covered by the first device 210 when looking toward the third surface 304a. Therefore, visual discomfort caused by covering the display 3001 of the vehicle 201 when the electronic device 200 is in the second mode or the third mode may be reduced. In an embodiment, when displaying content through a partial area of the display 3001 of the vehicle 201 that is not covered by the first device 210, some of the content may be selected as a display target.

Figure 4A:
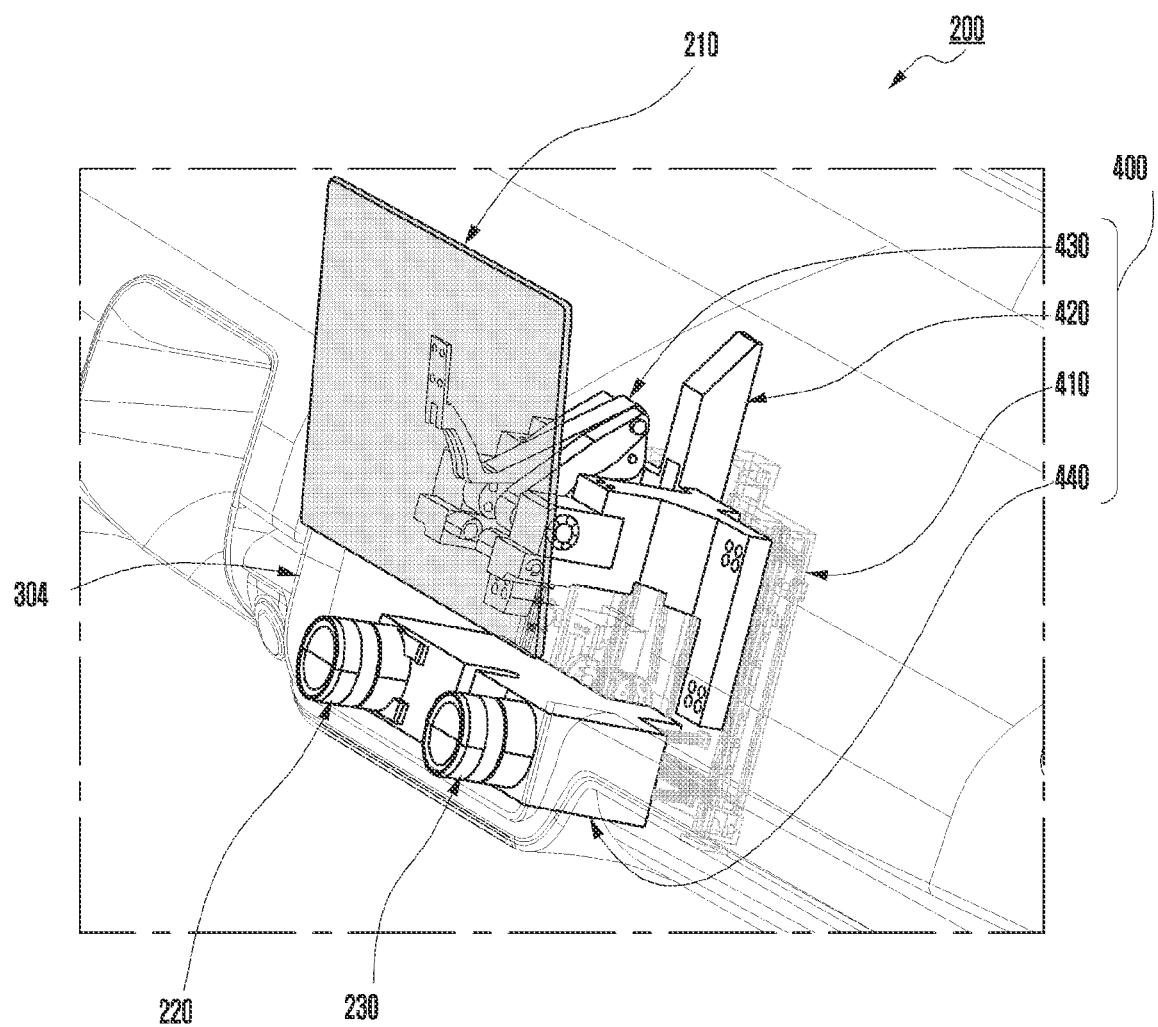
FIG. 4A is a perspective view illustrating the electronic device of FIG. 3C in a third mode, according to an embodiment.
Figure 4B:
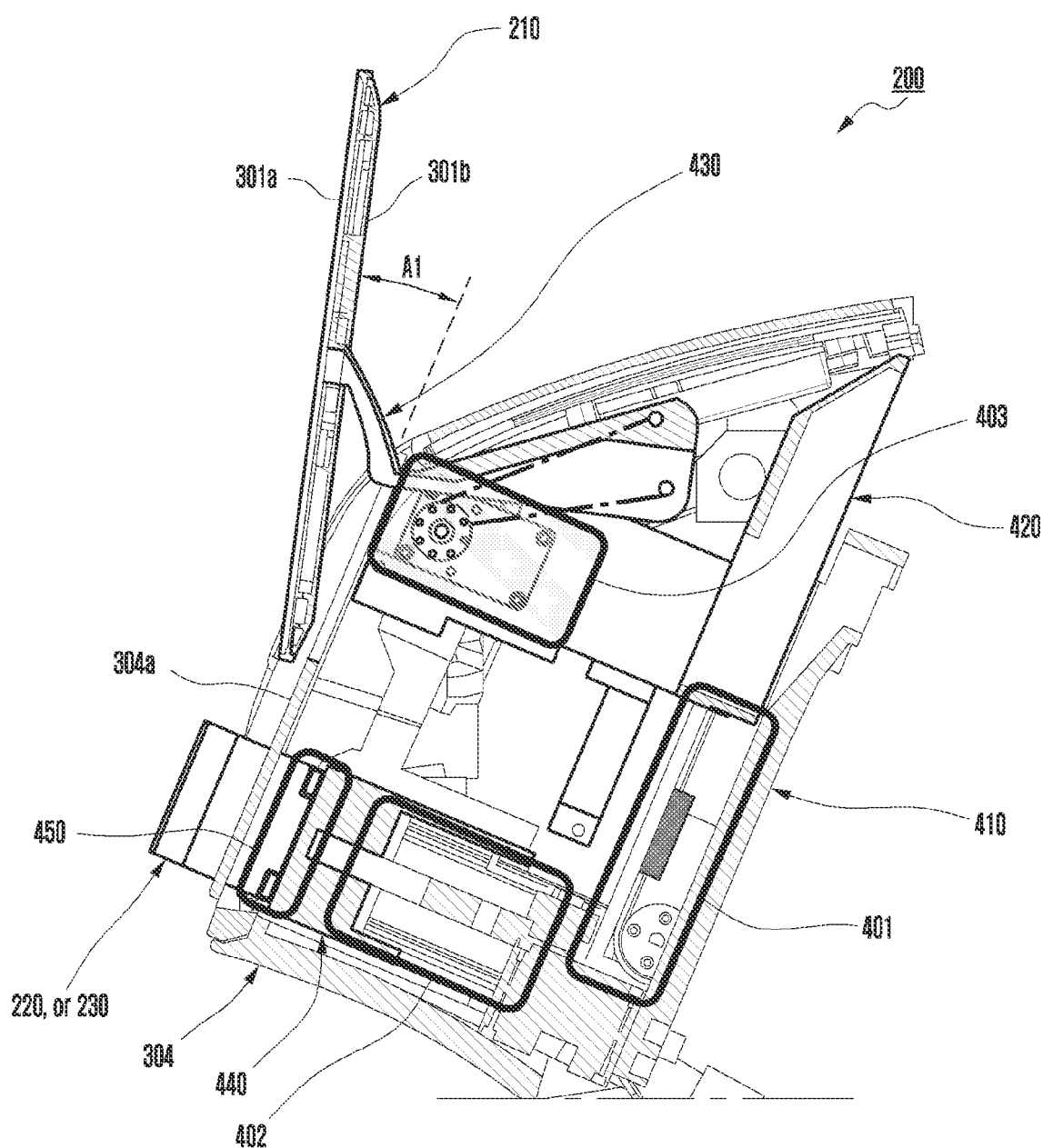
FIG. 4B is a cross-sectional view illustrating the electronic device of FIG. 4A in a third mode, according to an embodiment.

FIG. 4A is a perspective view illustrating the electronic device 200 of FIG. 3C in a third mode, according to an embodiment. FIG. 4B is a cross-sectional view illustrating the electronic device 200 of FIG. 4A in a third mode, according to an embodiment.

Referring to FIGS. 4A and 4B, in an embodiment, the electronic device 200 may include the first device 210, the second device 220, the third device 230, the fourth housing 304, and a connection assembly (or assembly) 400. The connection assembly 400 is a component connecting between the first device 210 and the second device 220 and between the first device 210 and the third device 230. The connection assembly 400 enables a translational or rotational motion of the first device 210 and/or a translational motion of the second device 220 or the third device 230.

According to an embodiment, the connection assembly 400 may include a support member 410, a first slider 420, a tilting device 430, and/or a second slider 440. The first slider 420 may be connected to the support member 410 to enable sliding (e.g., translational motion) on the support member 410. The second slider 440 may be connected to the support member 410 to enable sliding on the support member 410. The second slider 440 may be positioned at least in part within the fourth housing 304. The second device 220 and/or the third device 230 may be connected to the second slider 440 through an actuator 450. When an external force is applied to the second device 220 or the third device 230, the actuator 450 may deliver a force to a signal generating element (e.g., a push button switch, or a rotary switch) of the input device included in the second device 220 or the third device 230. The tilting device 430 may be connected between the first device 210 and the first slider 420, and may enable the first device 210 to rotate with respect to the first slider 420.

Referring to FIG. 4B, in an embodiment, the connection assembly 400 may include a first actuator 401 between the support member 410 and the first slider 420. When the electronic device 200 changes between the first mode (FIG. 3A) and the second mode (FIG. 3B), the first actuator 401 may cause a sliding (e.g. a translational motion) of the first slider 420 on the support member 410.

According to an embodiment, the connection assembly 400 may include a second actuator 402 between the support member 410 and the second slider 440. When the electronic device 200 changes between the first mode and the second mode, the second actuator 402 may cause a sliding (e.g. a translational motion) of the second slider 440 on the support member 410.

According to an embodiment, the connection assembly 400 may include a third actuator 403 between the first slider 420 and the tilting device 430. When the electronic device 200 changes between the second mode (FIG. 3B) and the third mode (FIG. 4A or 4B), the third actuator 403 may cause a rotational motion of the first device 210 with respect to the first slider 420.

According to an embodiment, each of the first actuator 401, the second actuator 402, and the third actuator 403 may include various driving elements such as at least one motor, a shaft connected to the motor, and/or wires. When the electronic device 200 changes between two modes of the first, second, and third modes, the processor (e.g., the processor 120 in FIG. 1) included in the first device 210 may control a motor controller electrically connected to the at least one motor. Thereby the at least one motor may drive the first slider 420, the second slider 440, and/or the tilting device 430. Each of the first actuator 401, the second actuator 402, and the third actuator 403 may be implemented based on other elements such as a solenoid and/or a cylinder.

According to an embodiment, in the third mode, the second surface 301b (or the first surface 301a) of the first device 210 may form a certain angle A1 (e.g., about 5 to 30 degrees) with the third surface 304a of the fourth housing 304. This angle A1 may be determined in consideration of a driver's visual comfort. In the third mode, the second device 220 and/or the third device 230 may be positioned to protrude from the third surface 304a of the fourth housing 304. In the third mode, the second and third devices 220 and 230 positioned to protrude may facilitate the driver to manipulate the second and third devices 220 and 230.

According to an embodiment, the first device 210 may be functionally or operatively connected to the second device 220. The electronic device 200 may include a first electrical path such as a flexible printed circuit board (FPCB) that electrically connects the first device 210 and the second device 220.

According to an embodiment, the first device 210 may be functionally or operatively connected to the third device 230. The electronic device 200 may include a second electrical path such as an FPCB that electrically connects the first device 210 and the third device 230.

Figure 5:
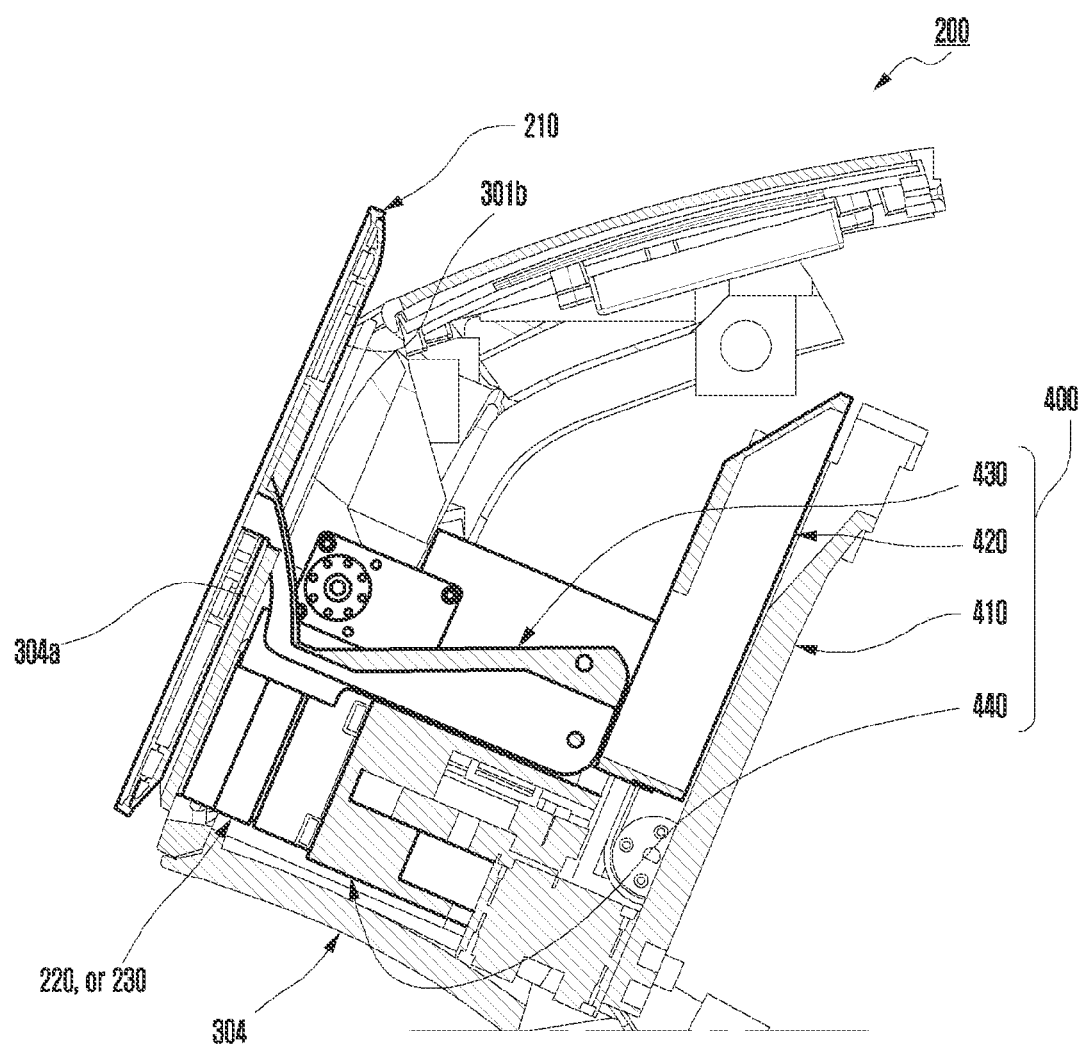
FIG. 5 is a cross-sectional view illustrating the electronic device of FIG. 3A in a first mode, according to an embodiment.

FIG. 5 is a cross-sectional view illustrating the electronic device 200 of FIG. 3A in a first mode, according to an embodiment.

In the descriptions of FIG. 5, redundant descriptions of components denoted by the same reference numerals as those shown in FIGS. 4A and 4B will be omitted. Referring to FIG. 5, in the first mode, the second device 220 and the third device 230 may be positioned so as not to protrude from the third surface 304a of the fourth housing 304. In the first mode, the second surface 301b of the first device 210 may be positioned to cover the second and third devices 220 and 230 while facing the third surface 304a of the fourth housing 304.

Figure 6A:
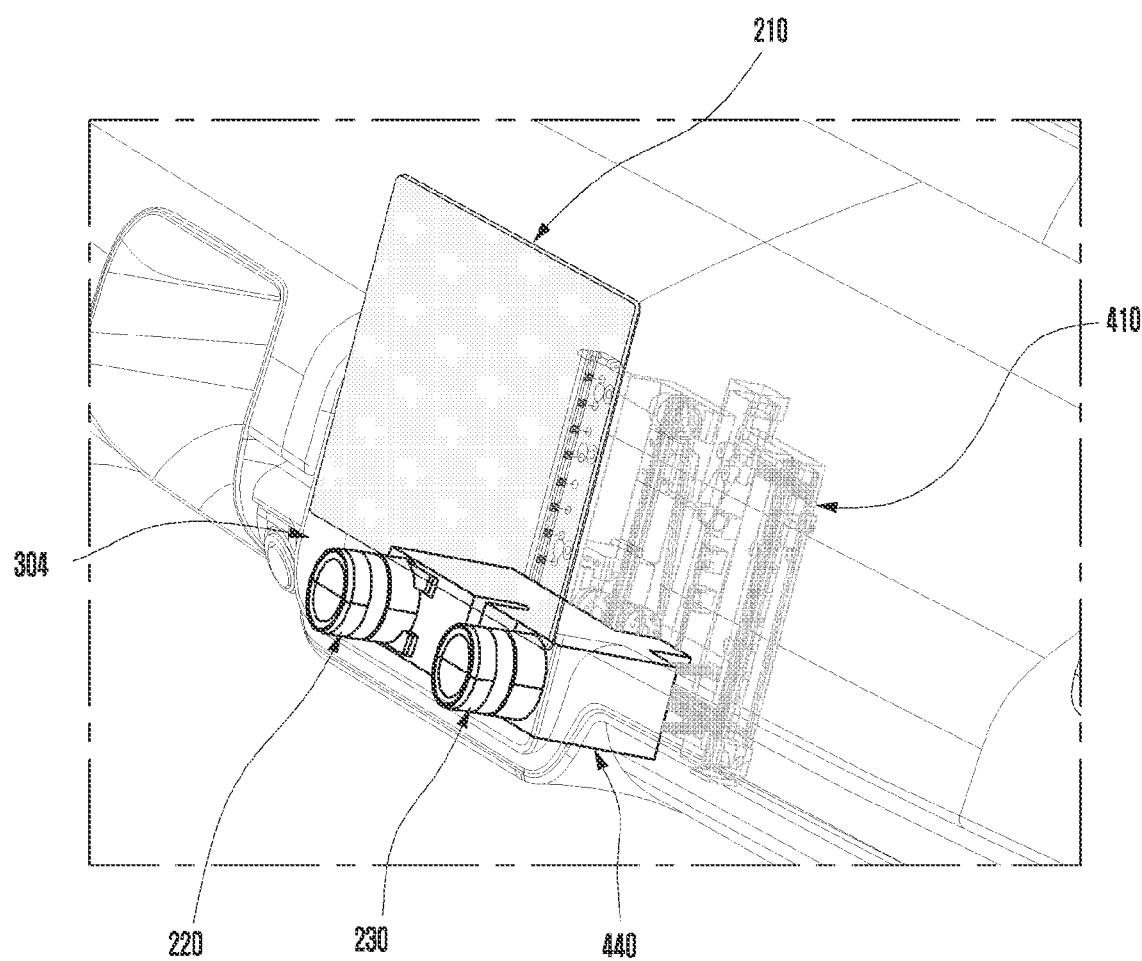
FIG. 6A is a perspective view illustrating the electronic device of FIG. 3B in a second mode, according to an embodiment.
Figure 6B:
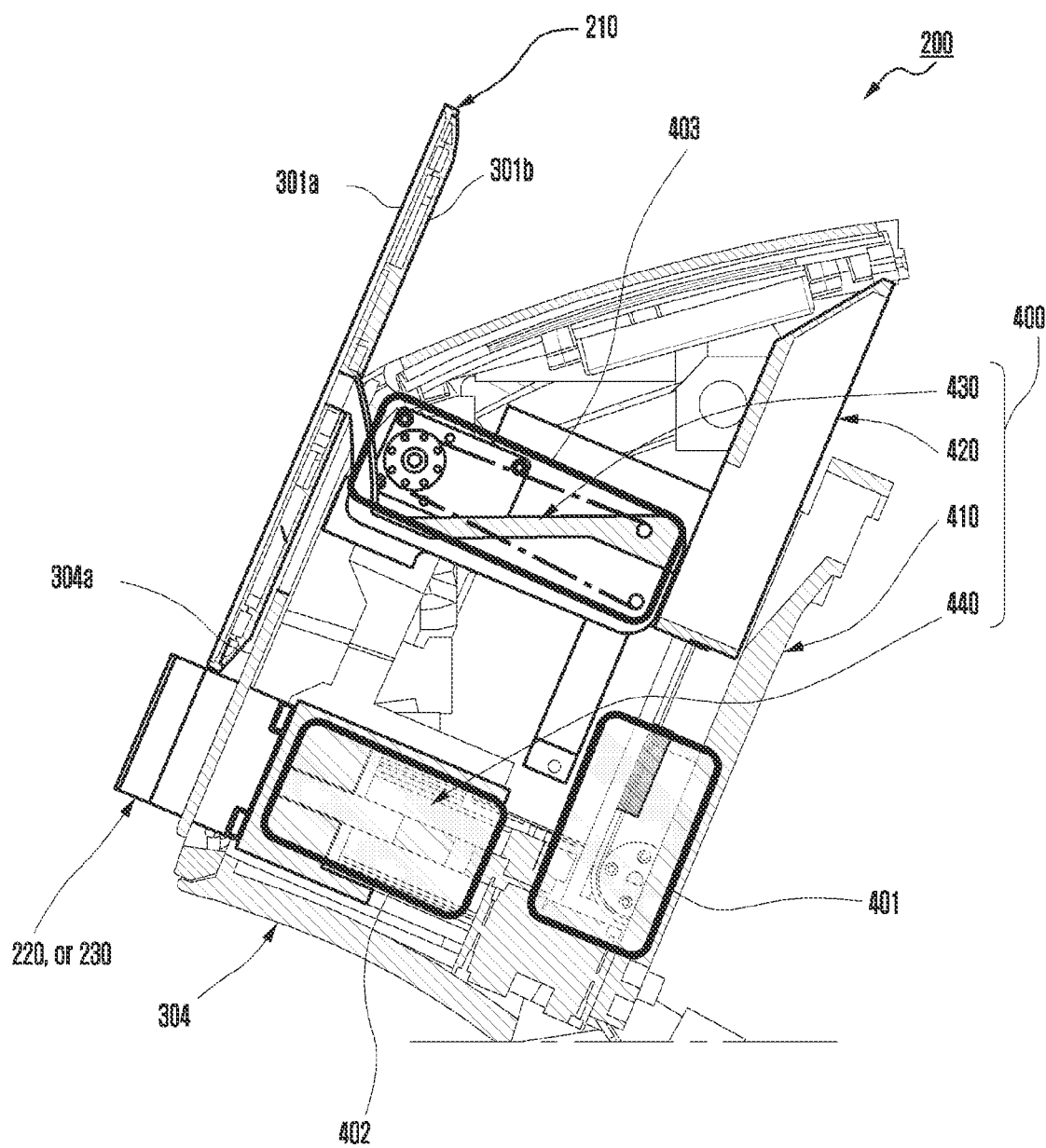
FIG. 6B is a cross-sectional view illustrating the electronic device of FIG. 6A in a second mode, according to an embodiment.

FIG. 6A is a perspective view illustrating the electronic device 200 of FIG. 3B in a second mode, according to an embodiment. FIG. 6B is a cross-sectional view illustrating the electronic device 200 of FIG. 6A in a second mode, according to an embodiment.

In the descriptions of FIGS. 6A and 6B, redundant descriptions of components denoted by the same reference numerals as those shown in FIGS. 4A and 4B will be omitted. Referring to FIGS. 6A and 6B, in the second mode, the first device 210 may be positioned so as not to cover the second and third devices 220 and 230. In the second mode, the second and third devices 220 and 230 may be positioned to protrude from the third surface 304a of the fourth housing 304.

According to an embodiment, the electronic device 200 may include a position control member for preventing collision between the first device 210 and the second device 220 (or the third device 230) when changing between the first mode (FIG. 5) and the second mode (FIG. 6B). In case of a change between the first mode and the second mode, the position control member may determine a position of the first slider 420, a position of the second slider 440, and/or a mode change timing between the first and second modes. In case of a change between the second mode and the third mode (FIG. 4B), the position control member may determine a position of the first slider 420, a rotation angle of the tilting device 430, and/or a mode change timing between the second and third modes.

According to an certain embodiment, the position control member may include at least one first limit switch corresponding to the first actuator 401, at least one second limit switch corresponding to the second actuator 402, and/or at least one third limit switch corresponding to the third actuator 403.

In case of a change from the first mode to the second mode, when the first slider 420 is moved to the predetermined position by the driving of the first actuator 401, the at least one first limit switch may contact a corresponding point and thereby generate a first contact signal. Then, the driving of the first actuator 401 may be stopped, and the second actuator 402 may be driven. When the second slider 440 is moved to the predetermined position by the driving of the second actuator 402, the at least one second limit switch may contact a corresponding point and thereby generate a second contact signal. Then, the driving of the second actuator 402 may be stopped.

In case of a change from the second mode to the first mode, when the second slider 440 is moved to the predetermined position by the driving of the second actuator 402, the at least one second limit switch may contact the corresponding point and thereby generate the second contact signal. Then, the driving of the second actuator 402 may be stopped, and the first actuator 401 may be driven. When the first slider 420 is moved to the predetermined position by the driving of the first actuator 401, the at least one first limit switch may contact the corresponding point and thereby generate the first contact signal. Then, the driving of the first actuator 401 may be stopped.

In case of a change between the second mode and the third mode, when the tilting device 403 is rotated at the predetermined angle by the driving of the third actuator 403, the at least one third limit switch may contact a corresponding point and thereby generate a third contact signal. Then, the driving of the third actuator 403 may be stopped.

According to various embodiments, the position control member may be implemented based on at least one sensor. The position control member may include at least one optical sensor (e.g., photodiode) capable of detecting light (e.g., infrared light) in a specific frequency range, and at least one light source (e.g., light emitting diode (LED)) corresponding to the at least one optical sensor. When the optical sensor and the light source are positioned facing each other, the optical sensor may generate an electrical signal based on light outputted from the light source. Based on the electrical signal generated by the optical sensor, the position of the first slider 420, the position of the second slider 440, and/or the mode change timing between the first and second modes may be determined in case of a change between the first and second modes. Also, based on the electrical signal generated by the optical sensor, the position of the first slider 420, the rotation angle of the tilting device 430, and/or the mode change timing between the second and third modes may be determined in case of a change between the second and third modes.

According to an embodiment, based on the driving state (e.g., a rotation direction, a rotation angle, a rotation amount, a rotation speed, a rotation acceleration, and/or a rotation angular velocity) of the at least one motor included in the first actuator 401, the second actuator 402, or the third actuator 403, the position of the first slider 420, the position of the second slider 440, and/or the mode change timing between the first and second modes may be determined in case of a change between the first and second modes. Also, based on the driving state of the at least one motor, the position of the first slider 420, the rotation angle of the tilting device 430, and/or the mode change timing between the second and third modes may be determined in case of a change between the second and third modes. The connection assembly 400 may further include a motor encoder for detecting the driving state of the at least one motor. The motor encoder may be composed of a disc and a detector. The disk is combined with the rotation shaft of the motor and has electronically recognizable scales and marks. The detector recognizes the scale and mark of the disk and thereby detects the rotation direction, rotation angle, rotation amount, rotation speed, rotation acceleration, and/or rotation angular velocity of the rotation shaft.

Figure 7:
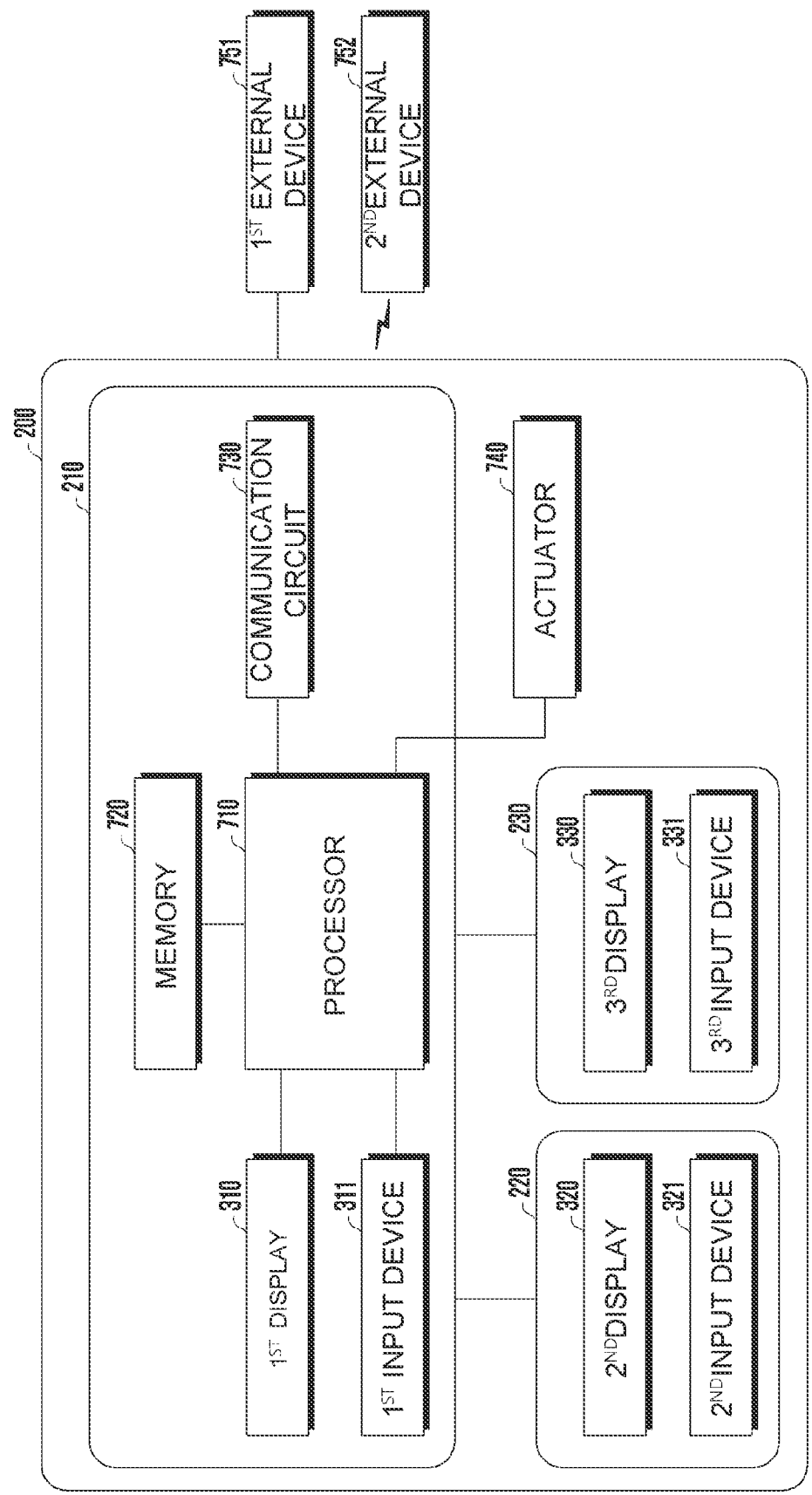
FIG. 7 is a block diagram illustrating the electronic device of FIG. 2, according to an embodiment.

FIG. 7 is a block diagram illustrating the electronic device 200 of FIG. 2, according to an embodiment.

Referring to FIG. 7, in an embodiment, the electronic device 200 may include the first device 210, the second device 220, the third device 230, and/or an actuator 740.

According to an embodiment, the first device 210 may include a processor 710, a first display 310, a first input device 311, a memory 720, and/or a communication circuit 730. In some embodiments, at least one of these components of the first device 210 may be omitted, and one or more other components (e.g., a speaker, a camera, a microphone, and/or a sensor) may be added to the first device 210. Redundant descriptions regarding the same components of the first device 210 as those described in FIGS. 2 to 3C will be omitted.

The processor 710 (e.g., the processor 120 in FIG. 1) may control at least one hardware or software component of the electronic device 200 by executing software, for example, and perform data processing. As at least part of the data processing, the processor 710 may load an instruction or data received from any other component into a volatile memory, process the instruction or data loaded in the volatile memory, and store resultant data in a nonvolatile memory.

According to an embodiment, the first input device 311 may be a first touch sensing circuit (e.g., a first touch sensor) included in the first display 310. The first touch sensing circuit may detect various types of touch inputs or gesture inputs. The gesture input may relate to finger movements (or finger movement patterns). In a certain embodiment, the first input device 311 may further include an input device implemented in various ways.

The memory 720 (e.g., the memory 130 in FIG. 1) may store various data used by at least one component (e.g., the processor 710) of the electronic device 200. The data may include software (e.g., the program 140 in FIG. 1) and input/output data for related instructions.

The communication circuit 730 (e.g., the communication module 190 in FIG. 1) may support, for example, establishing a direct (e.g., wired) communication channel between the electronic device 200 and a first external electronic device 751, establishing a wireless communication channel between the electronic device 200 and a second external electronic device 752, and/or performing communication through the established communication channel. The communication circuit 730 may include one or more communication processors that operate independently of the processor 710 (e.g., an AP) and support direct (e.g., wired) communication or wireless communication.

According to an embodiment, the second device 220 may include a second display 320 and/or a second input device 321. The second input device 321 may include an actuator (e.g., the actuator 450 in FIG. 4B) connected to a housing (e.g., the second housing 302 in FIG. 2), and a signal generating element connected to the actuator. A movement of the housing by an external force may cause a motion of the actuator, and the signal generating element may generate an electrical signal in response to the motion of the actuator. The second input device 321 may be implemented as a push button or a rotary button. In a certain embodiment, the second input device 321 may further include a second touch sensing circuit (e.g., a second touch sensor) included in the second display 320. The second touch sensing circuit may detect various types of touch inputs or gesture inputs (e.g., finger movements or finger movement patterns).

According to an embodiment, the third device 230 may include a third display 330 and/or a third input device 331. The third input device 331 may be implemented in substantially the same manner as the second input device 321. For example, the third input device 331 may be implemented as a push button or a rotary button. In a certain embodiment, the third input device 331 may further include a third touch sensing circuit (e.g., a third touch sensor) included in the third display 330. The third touch sensing circuit may detect various types of touch inputs or gesture inputs.

According to an embodiment, the actuator 740 may convert an electrical signal of the processor 710 into a physical motion (e.g., a linear motion or a rotational motion) of the first device 210, the second device 220, or the third device 230. The actuator 740 may include the first actuator 401, the second actuator 402, and/or the third actuator 403 as shown in FIG. 4B.

According to an embodiment, the electronic device 200 may include an IVI system. The IVI system includes an electronic control unit (ECU)/micro controller unit (MCU) and/or an OS in order to not only provide information such as navigation, audio, and video, but also offer and control entertainment functions. The ECU may be an electronic control device that controls the state of vehicle components such as an engine, an automatic transmission, and/or an anti-lock brake system (ABS) with a computer.

According to an embodiment, the electronic device 200 may be functionally or operatively connected to at least one external electronic device (e.g., the first external electronic device 751 and/or the second external electronic device 752). In relation to vehicle control functions, the electronic device 200 may be functionally or operatively connected to the first external electronic device 751 located in the vehicle 201 of FIG. 2. The vehicle control functions may include, for example, a steering function, a heating, ventilation and air conditioning (HVAC) function, a seat position adjustment function, a seat temperature adjustment function, a rearview mirror (or side mirror) adjustment function, a window and sunroof control function, a gas outlet open/close function, a speaker volume control function, a driving mode setting function, and/or a voice agent function.

According to a certain embodiment, the first external electronic device 751 may include an advanced driver assistance systems (ADAS) installed in the vehicle 201 of FIG. 2. The ADAS may recognize and determine various situations that may occur during driving, and thereby control suitable mechanical devices appropriately. The ADAS may include various systems such as an autonomous emergency braking (AEB) system that slows down or stops driving by itself even if the driver does not step on the brake system in case of a collision risk, a lane keep assist system (LKAS) that maintains the lane by adjusting a driving direction in case of a lane departure, an advanced smart cruise control (ASCC) system that maintains a distance from a vehicle ahead while running at a predetermined speed, an active blind spot detection (ABSD) system that detects the risk of collision in blind spots and helps to change lanes safely, and/or an around view monitor (AVM) system that visually shows the situation around the vehicle. The ASCC system automatically operates at a speed set by the driver, measures a distance between vehicles in real time using a radar sensor installed in the front of the vehicle, and maintains an appropriate distance between vehicles. The AEB system detects a front vehicle or pedestrian with a front camera sensor and a radar sensor, and automatically provides emergency braking when the driver does not control the vehicle. The LKAS system prevents drowsy driving or inexperienced driving, and automatically controls the steering wheel to maintain the lane when the driver leaves the lane without manipulating a turn signal. The ABSD system not only detects vehicles in rear blind spots and turns on an alarm in the side mirrors, but also prevents accidents by controlling when the driver tries to change lanes without seeing the vehicle in the blind spot.

According to various embodiments, the first external electronic device 751 may include an autonomous vehicle (AV) system installed in the vehicle 201 of FIG. 2.

The IVI system of the electronic device 200 may include, for example, a particular application specialized for a vehicle environment while enabling smooth interworking with various applications used in the second external electronic device 752 such as a smartphone. The electronic device 200 may be wirelessly, or widely, connected to the second external electronic device 752.

Figure 8:
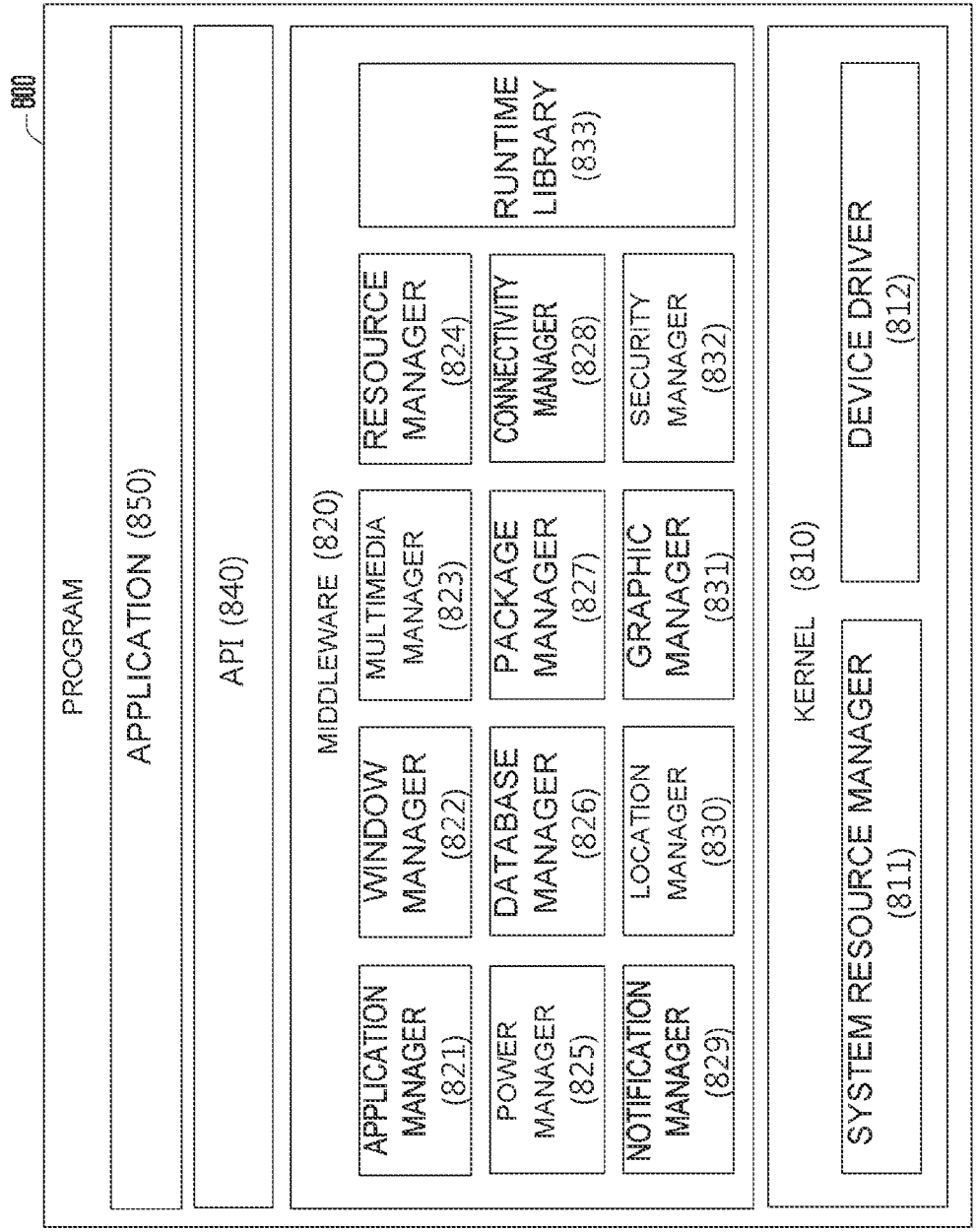
FIG. 8 is a block diagram illustrating a program stored in the memory of FIG. 7 according to an embodiment.

FIG. 8 is a block diagram illustrating a program 800 (e.g., the program 140 in FIG. 1) stored in the memory 720 of FIG. 7, according to an embodiment.

Referring to FIG. 8, the program 800 may include an operating system (e.g., the OS 142 in FIG. 1) controlling resources related to the electronic device 200, and/or various applications running on the operating system. The program 800 may include a kernel 810, a middleware 820 (e.g., the middleware 144 in FIG. 1), an application programming interface (API) 840, and/or an application 850 (e.g., the application 146 in FIG. 1). At least part of the program 800 may be preloaded on the electronic device 200 in FIG. 7 or downloaded from an external electronic device (e.g., the external electronic device 102 or 104 or the server 108 in FIG. 1). At least some of the kernel 810, middleware 820, and/or API 840 may be referred to as the operating system.

The kernel 810 may control or manage, for example, system resources (e.g., the processor 710 and/or the memory 720 in FIG. 7) used to execute an operation or function implemented in other programs (e.g., the middleware 820, the API 840, and/or the application 850). In addition, the kernel 810 may provide an interface for controlling or managing system resources by accessing individual components of the electronic device 200 of FIG. 7 from the middleware 820, the API 840, or the application 850. The kernel 810 may include, for example, a system resource manager 811 and/or a device driver 812. The system resource manager 811 may control, allocate, and/or recover system resources. The system resource manager 811 may include a process manager, a memory manager, and/or a file system manager.

The device driver 812 may be, for example, software that connects hardware and the operating system. The device driver 812 may have information such as a driving method, function, or characteristic of hardware so that the hardware can operate without errors in the electronic device 200. The processor 710 of FIG. 7 may control hardware through the device driver 812. Referring to FIGS. 7 and 8, the device driver 812 may include, for example, a display driver for the first display 310, a display driver for the second display 320, and/or a display driver for the third display 330. The device driver 812 may include, for example, an input device driver for the first input device 311, an input device driver for the second input device 321, and/or an input device driver for the third input device 331. The device driver 812 may include, for example, an actuator driver for the actuator 840. In various embodiments, the device driver 812 may include various other drivers in connection with various kinds of hardware included in the electronic device 200.

The middleware 820 may perform an intermediary function so that the API 840 or the application 850 communicates with the kernel 810 to exchange data. The middleware 820 may enable smooth communication between the application 850 and an environment in which the application 850 is operated. Also, the middleware 820 may process one or more task requests received from the application 850, based on priority. The middleware 820 may assign priority to at least one of the applications 850 to use the system resources (e.g., the processor 710 and/or the memory 720) of the electronic device 200 of FIG. 7, and process the one or more task requests. The API 840 is an interface for the application 850 to control functions provided by the kernel 810 or the middleware 820, and may include, for example, at least one interface or function (e.g., instructions) for file control, window control, image processing, character control, and the like. The middleware 820 may provide a function commonly required by the application 850, or provide various functions to the application 850 through the API 840 so that the application 850 can use limited system resources in the electronic device 200. The middleware 820 may include at least one of a runtime library 833, an application manager 821, a window manager 822, a multimedia manager 823, a resource manager 824, a power manager 825, a database manager 826, a package manager 827, a connectivity manager 828, a notification manager 829, a location manager 830, a graphic manager 831, or a security manager 832.

The runtime library 833 may include, for example, a library module used by a compiler to add a new function through a programming language while the application 850 is being executed. The runtime library 833 may perform input/output management, memory management, and/or arithmetic function processing. The application manager 821 may manage, for example, a life cycle of the application 850. The window manager 822 may manage graphical user interface (GUI) resources used on the screen. The multimedia manager 823 may identify formats required for playing media files and perform encoding or decoding of a media file by using a codec suitable for the corresponding format. The resource manager 824 may manage a source code of the application 850 and/or a space of the memory 720 of FIG. 7. The power manager 825 may manage power and provide power information necessary for the operation of the electronic device 200 of FIG. 7. The power manager 825 may interwork with a basic input/output system (BIOS). The database manager 826 may create, search, or change a database to be used in an application. The package manager 827 may manage installation or update of the application 850 distributed in the form of a package file. The connectivity manager 828 may manage, for example, a wired connection or a wireless connection between the electronic device 200 of FIG. 7 and an external electronic device. The notification manager 829 may provide an event such as a received message, an appointment, a schedule, or a proximity notification to the user. The location manager 830 may manage location information of the electronic device 200 of FIG. 7. The graphic manager 831 may manage, for example, a graphic effect to be provided to the user or a related user interface. The security manager 832 may provide system security or user authentication. In various embodiments, the middleware 820 may further include a telephony manager for managing a video call function. The middleware 820 may include a middleware module capable of forming a combination of functions of the above-described components. The middleware 820 may provide modules specialized for each type of operating system. The middleware 820 may dynamically delete some of the existing components or add new components.

The API 840 is, for example, a set of API programming functions, and may be provided in different configurations depending on the operating system.

According to an embodiment, the application 850 may include applications related to various contents such as a music, a movie, a game, a navigation (e.g., an application that helps driving by showing a map or finding a shortcut), a browser, an email, a calendar, a clock, or contact information.

According to an embodiment, the application 850 may include an application related to a device located in a vehicle (e.g., the vehicle 201 in FIG. 2). The application 850 may include a climate control that enables a vehicle occupant to control a vehicle's air conditioning unit by using the electronic device 200 of FIG. 7. The application 850 may include a rear seat entertainment (RSE) control that enables a vehicle occupant to control a display mounted on a head of a front seat by using the electronic device 200 of FIG. 7. The application 850 may include an application for controlling the actuator 740 of FIG. 7. In addition, there may be various applications related to in-vehicle device control.

According to an embodiment, the application 850 may include an application related to an in-vehicle driver or occupant. For example, the application 850 may include a driver monitor system (DMS) or an occupant monitoring system (OMS). The DMS may guide the driver to control the vehicle by providing notifications or warnings to the driver depending on situations. The OMS may provide a suitable environment for the occupant by monitoring the status of the occupant. The DMS or the OMS may monitor the driver's presence or condition by using a camera facing the driver's face. For example, the application 850 may include a voice assistant that enables a corresponding operation based on a user's voice command. The voice assistant may include, for example, an artificial intelligence (AI) virtual assistant function. The AI virtual assistant function may interpret a user's voice command as a context and then search for information or run an application. The AI virtual assistant function may recognize an object, image, text, or QR code through a camera and then provide related information. The application 850 may include an application (e.g., cabin talk) that allows the driver or occupant on a front seat to have a conversation with an occupant on a rear seat without raising a voice. In addition, there may be various applications related to the occupant in the vehicle.

According to an embodiment, the application 850 may include an application that assists driving. For example, the application 850 may include a surround view monitoring (SVM) or a camera monitoring system (CMS). The SVM may make a space around the vehicle visible from inside the vehicle through cameras attached to various places on the vehicle (e.g. the front, rear, or side of the vehicle). The CMS may secure the driver's view by using a camera in place of the side mirror. There may be a variety of other applications that assist in driving.

According to an embodiment, the application 850 may include an application related to an external electronic device such as a smartphone. For example, the application 850 may include a desktop experience (DeX) that connects the smartphone with the electronic device 200 of FIG. 7 to display the UX of the smartphone on the first display 310. For example, the application 850 may include an application related to the Internet of things (IoT). There may be various applications related to an external electronic device.

According to various embodiments, the application 850 may include an application that provides environmental information (e.g., information about atmospheric pressure, humidity, and/or temperature).

According to various embodiments, the application 850 may include various other applications related to its purpose.

According to an embodiment, the application 850 may include an information exchange application that supports the exchange of information between the electronic device 200 of FIG. 7 and an external electronic device (e.g., the external electronic device 751 or the second external electronic device 752 in FIG. 7). The information exchange application may include a notification delivery application for delivering specific information to an external electronic device, or a device management application for managing an external electronic device. The notification delivery application may deliver notification information generated by another application of the electronic device 200 to an external electronic device, or may provide notification information received from an external electronic device to the user. The device management application may install, delete, or update a function of an external electronic device (e.g., turn-on/turn-off of the external electronic device itself or some components thereof) that communicates with the electronic device 200), or an application running in the external electronic device. The application 850 may include an application designated depending on a property of an external electronic device. The application 850 may include an application received from an external electronic device. At least part of the program 800 may be implemented (e.g., executed) in software, firmware, hardware (e.g., the processor 710), or a combination thereof, and may include a module, routine, instruction set, or process for performing one or more functions.

According to an embodiment, the electronic device 200 of FIG. 7 may include a user authentication based system. The user authentication system may utilize a user profile about an authenticated user in order to provide a personalized service. Through the user profile, the electronic device 200 may be operated in consideration of personal characteristics and/or preferences.

According to an embodiment, the memory 720 of FIG. 7 may store the user profile. The user profile may include personal information related to identity, or personal data. The user profile may be personal data constituting a user account generated by means of identification, management, or security purposes of an individual authorized by the electronic device 200. The personal data constituting such a user account may be obtained through a user registration procedure.

According to an embodiment, the user profile may not only contain information (e.g., personal data constituting a user account), such as a name (or ID) or a password of an authorized user, necessary for a user to log in to the electronic device 200, but also contain various kinds of information such as a resource access permission item or a resource access restriction item that the user has. The user profile may be updated in various operations related to the operation of the electronic device 200.

The electronic device 200 may include, for example, user interfaces related to various functions. The user interface may refer to a device or software that facilitates interaction between the user and the electronic device 200. The user interface may include hardware for the user to communicate with the electronic device 200, such as an input device (e.g., the first input device 311, the second input device 321, or the third input device 331 in FIG. 7), or an output device (e.g., the first display 310, the second display 320, or the third display 330 in FIG. 7), and also include a part of a program that interacts with both the user and the electronic device 200 to allow both to exchange information. In the user profile, the information (e.g., personal data constituting a user account) necessary for a user to log in to the electronic device 200 may be obtained based on at least in part a user input received through a user interface related to user registration. At least a part of the user profile may be set through a user interface related to an input/output interface. The input/output interface may deliver commands or data inputted from a user or other external device to other component(s) of the electronic device 200, or output commands of data received from other component(s) of the electronic device 200 to the user or other external device.

According to an embodiment, at least a part of the user profile may be utilized for a user interface related to changing between the first mode and the second mode, or set (or configured) as a part of the user interface. In addition, at least a part of the user profile may be utilized for a user interface related to changing between the second mode and the third mode, or set as a part of the user interface.

According to an embodiment, in the first mode, at least a part of the user profile may be utilized for a user interface related to outputting through the first display 310 of FIG. 7 and/or inputting through the first input device 311, or set as a part of the user interface.

According to an embodiment, in the second mode or the third mode, at least a part of the user profile may be utilized for a user interface related to outputting through the first display 310, the second display 320, or the third display 330 of FIG. 7 and/or inputting through the first input device 311, the second input device 321, or the third input device 331, or set as a part of the user interface.

Figure 9:
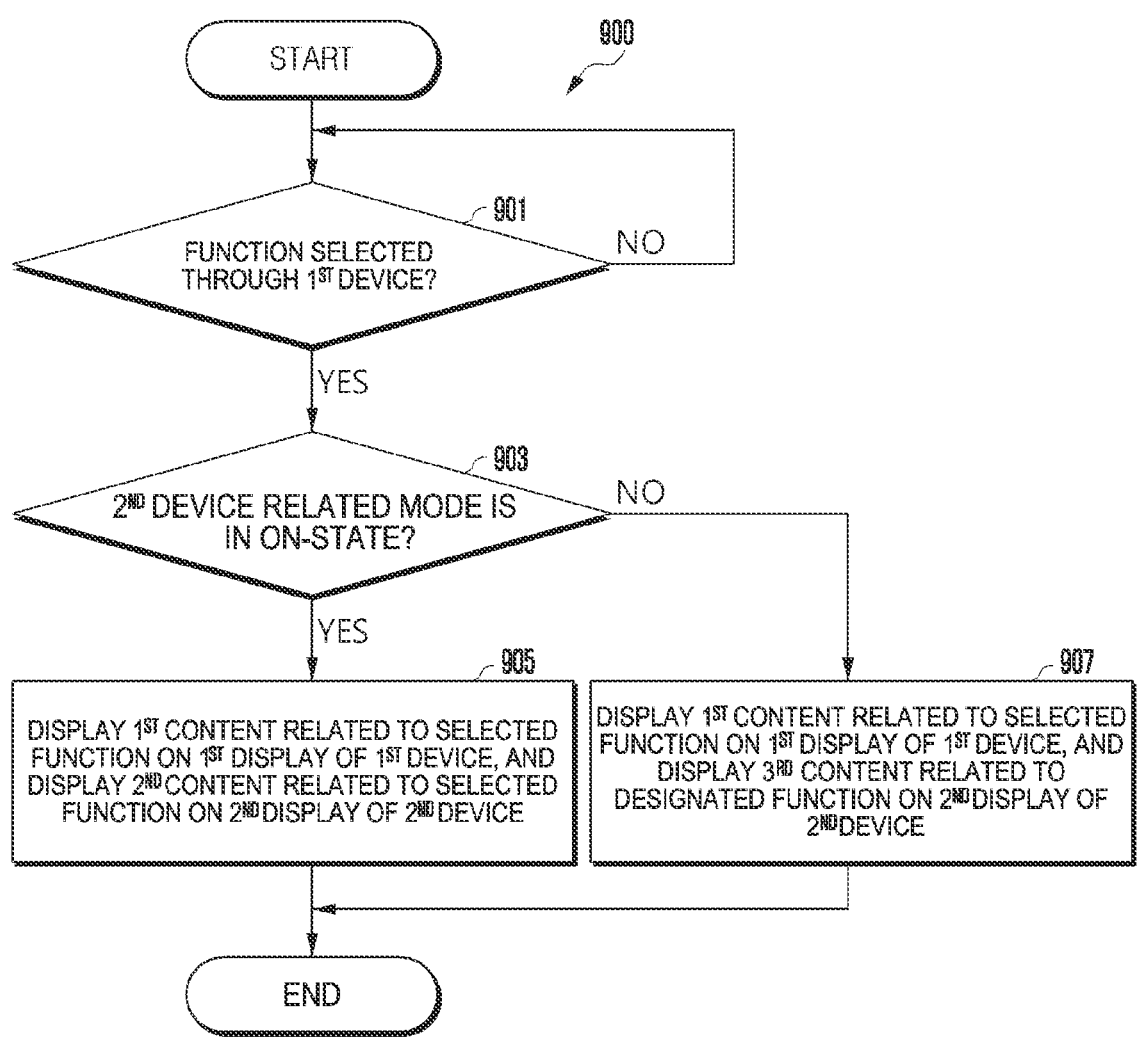
FIG. 9 illustrates an operation flow of the electronic device of FIG. 7 in a second mode, according to an embodiment.

FIG. 9 illustrates an operation flow 900 of the electronic device 200 of FIG. 7 in a second mode, according to an embodiment. FIGS. 10A, 10B, 10C, and 10D are diagrams illustrating the operation flow 900 of FIG. 9, according to an embodiment.

Figure 10A:
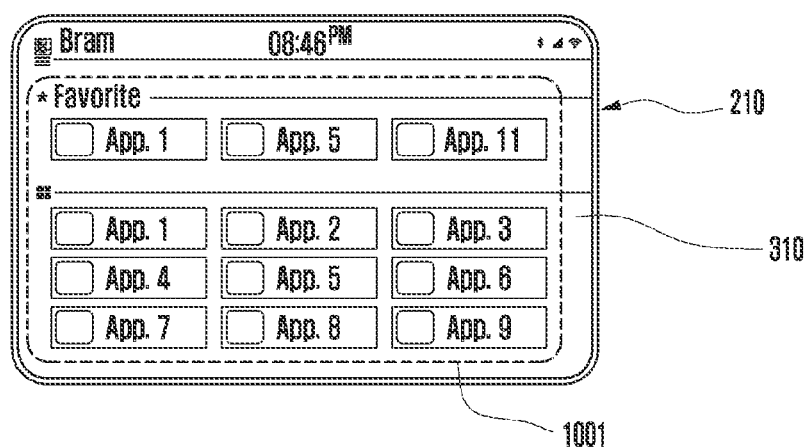
FIGS. 10A, 10B, 10C, and 10D are diagrams illustrating the operation flow of FIG. 9, according to an embodiment.

Referring to FIG. 9, according to an embodiment, at step 901, the processor 710 may identify whether a function is selected through the first device 210. Referring to FIG. 10A, the first device 210 may display items 1001 related to various functions (e.g., applications) through the first display 310. Then, one of the items 1001 may be selected based on a user input through the first input device 311 (e.g., a first touch sensing circuit) of the first device 210. When one of the items 1001 is selected, a function corresponding to the selected item may be executed. In a certain embodiment, the selection of the function may be performed through the second device 220. In a certain embodiment, the selection of the function may be performed through an external electronic device (e.g., a vehicle or a smartphone) that is functionally or operatively connected to the electronic device 200.

According to an embodiment, at step 903, the processor 710 may determine whether a mode associated with the second device 220 is in an on-state. When it is determined at step 903 that the associated mode with the second device 220 is in the on-state, at step 905 the processor 710 may display first content related to the function selected at step 901 through the first display 310 of the first device 210 and also display second content related to the selected function through the second display 320 of the second device 220.

Figure 10B:
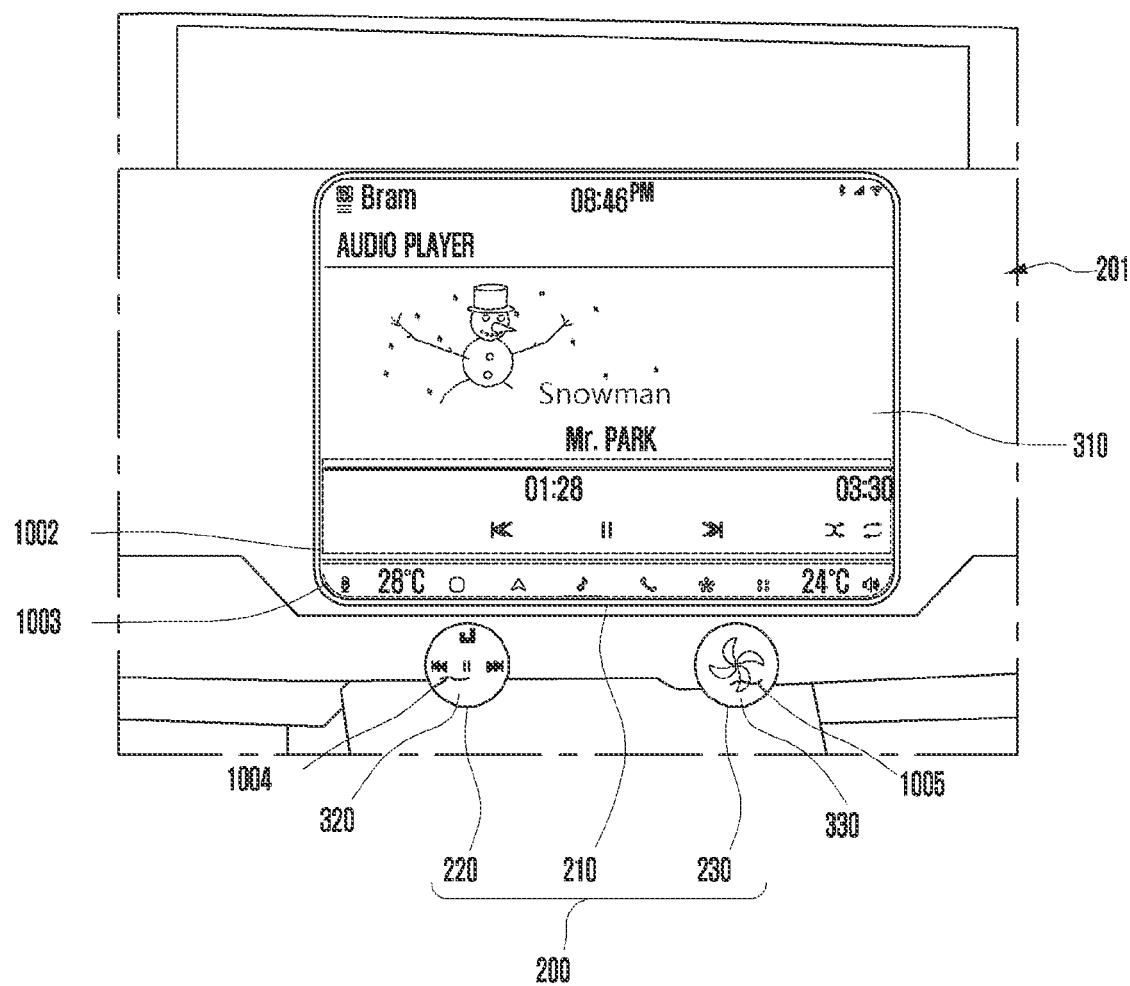

FIG. 10B illustrates a case where the function selected through the first device 210 is, for example, an audio player. The electronic device 200 may provide a user interface related to the audio player through the first device 210, and the first content related to the user interface may be displayed on the first display 310. The first content may include information about audio data, such as a title (e.g., "Snowman") and an artist (e.g., "Mr. PARK"), and/or various controls 1002. These controls may be, for example, playback start, pause, playback speed control, and the like. The processor 710 may perform various operations related to the audio player, based on a touch input on the first content displayed on the first display 310. Together with the first content, various shortcuts 1003 may be displayed on the first display 310 to enable quick execution of other functions.

According to an embodiment, when the associated mode with the second device 220 is in the on-state, the processor 710 may also provide a user interface related to the audio player through the second device 220, and the second content 1004 related to the user interface may be displayed on the second display 320. The second content 1004 may include various controls related to the audio player. These controls may be playback start, pause, playback speed control, and the like. Using the user interface provided through the second device 220 instead of the first device 210, the user may trigger various operations related to the audio player. The processor 710 may perform various operations related to the audio player, based on a touch input on the second content 1004 displayed on the second display 320. The processor 710 may also perform various operations related to audio play, based on a user input generated through a push button or a rotary button included in the second device 220. If the second content 1004 includes a control for adjusting the volume, the processor 710 may adjust the volume for audio play, based on a user input detected through the rotary button. In various embodiments, the associated mode may be referred to as a mode in which displaying content related to a function selected at step 901 of FIG. 9 is not limited to the first device 210 but is expanded to the second device 220.

According an embodiments, when it is determined at step 903 that the associated mode with the second device 220 is in an off-state, at step 907 the processor 710 may display third content related to a designated function through the second display 320. The operation flow of the first and third devices 210 and 230 of FIG. 7 in the second mode may be substantially the same as that of FIG. 9. Referring to FIG. 10B, if a mode associated with the third device 230 is in an off-state, the processor 710 may provide a user interface related to a designated function through the third device 230, and the third content 1005 related to the user interface may be displayed on the third display 330. The designated function related to the third content 1005 may be related to, for example, an air conditioning unit of the vehicle 201.

The processor 710 may deliver various control commands related to the air conditioning unit of the vehicle 201 to the vehicle control system of the vehicle 201, based on a touch input on the third content 1005 displayed on the third display 330. Also, the processor 710 may deliver various control commands related to the air conditioning unit of the vehicle 201 to the vehicle control system of the vehicle 201, based on a user input generated through a push button included in the third input device 331 of FIG. 7. In addition, the processor 710 may deliver various control commands related to the air conditioning unit of the vehicle 201 to the vehicle control system of the vehicle 201, based on a user input generated through a rotary button included in the third input device 331 of FIG. 7. The third content 1005 related to the air conditioning unit of the vehicle 201 may vary according to a designated function.

Figure 10C:
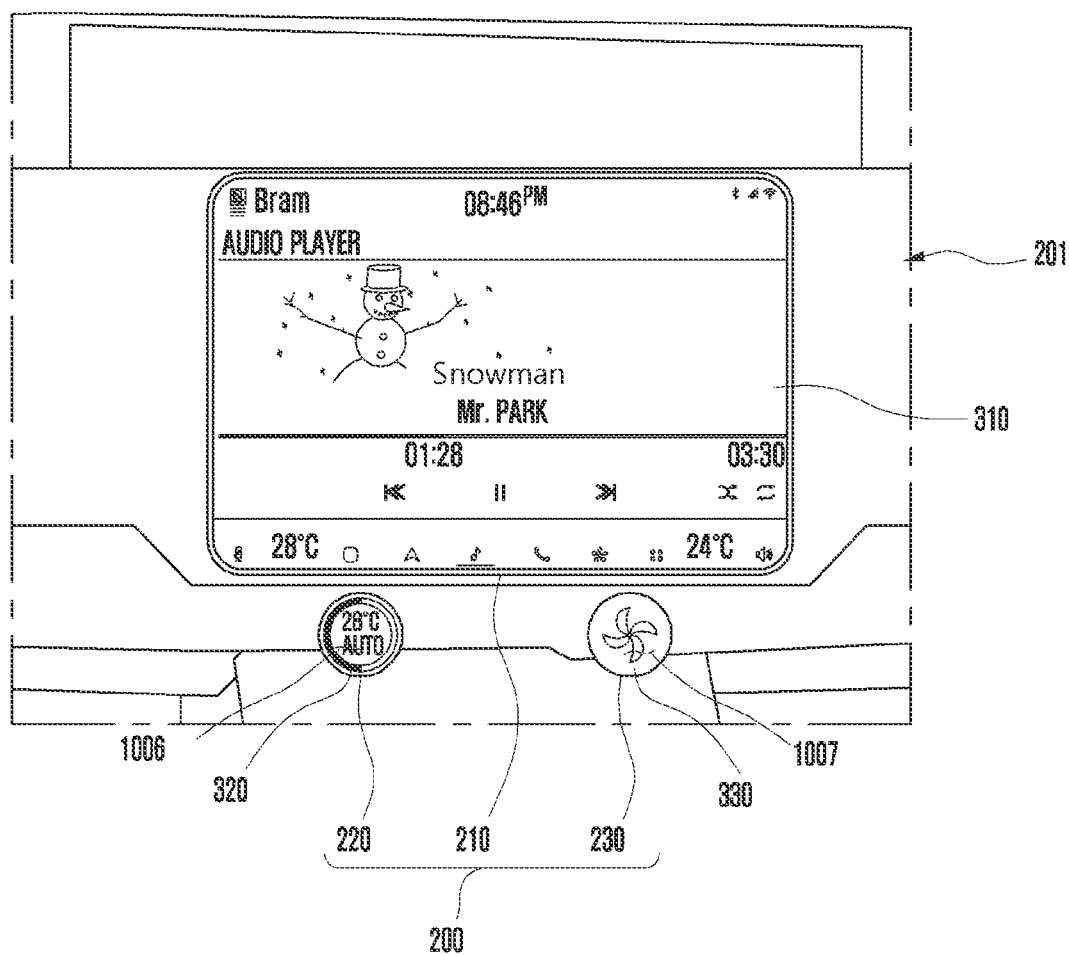

FIG. 10C illustrates a case where the mode associated with both the second device 220 and the third device 230 is, for example, in an off-state. Referring to FIG. 10C, content 1006 related to a designated function may be displayed on the second display 320. Also, content 1007 related to the designated function may be displayed on the third display 330. The designated function may be an air conditioning function of the vehicle 201, and the content 1006 or 1007 may include various controls related to the air conditioning function.

Figure 10D:
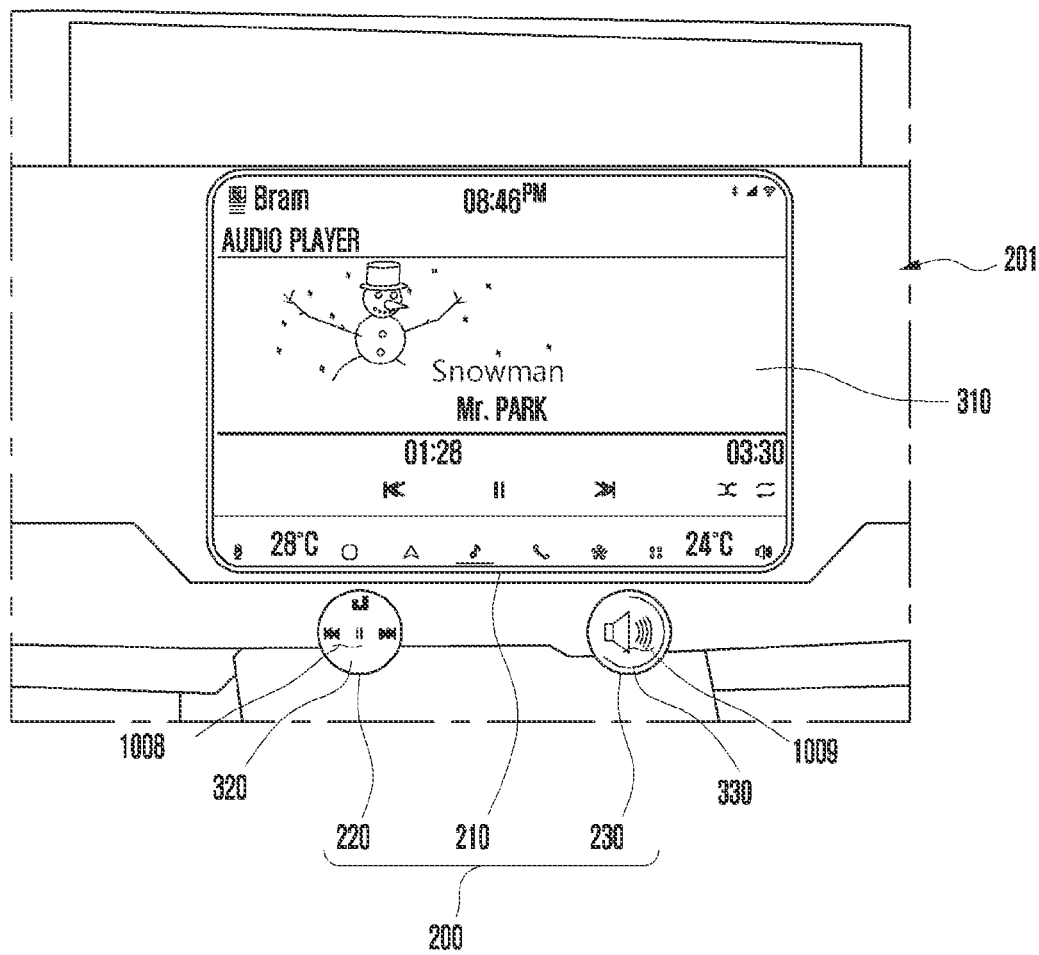

FIG. 10D illustrates a case where the mode associated with both the second device 220 and the third device 230 is, for example, in an on-state. Referring to FIG. 10D, content 1008 (e.g., the second content 1004 in FIG. 10B) substantially associated with the function selected at step 901 of FIG. 9 may be displayed on the second display 320. In addition, content 1009 (e.g., a control related to volume control) substantially associated with the function selected at step 901 of FIG. 9 may be displayed on the third display 330.

According to an embodiment, the on-state or off-state regarding the mode associated with the second device 220 or the third device 230 may be set based on a user input. In various embodiments, information about the on-state or off-state of the associated mode may be included in a user profile.

Figure 11:
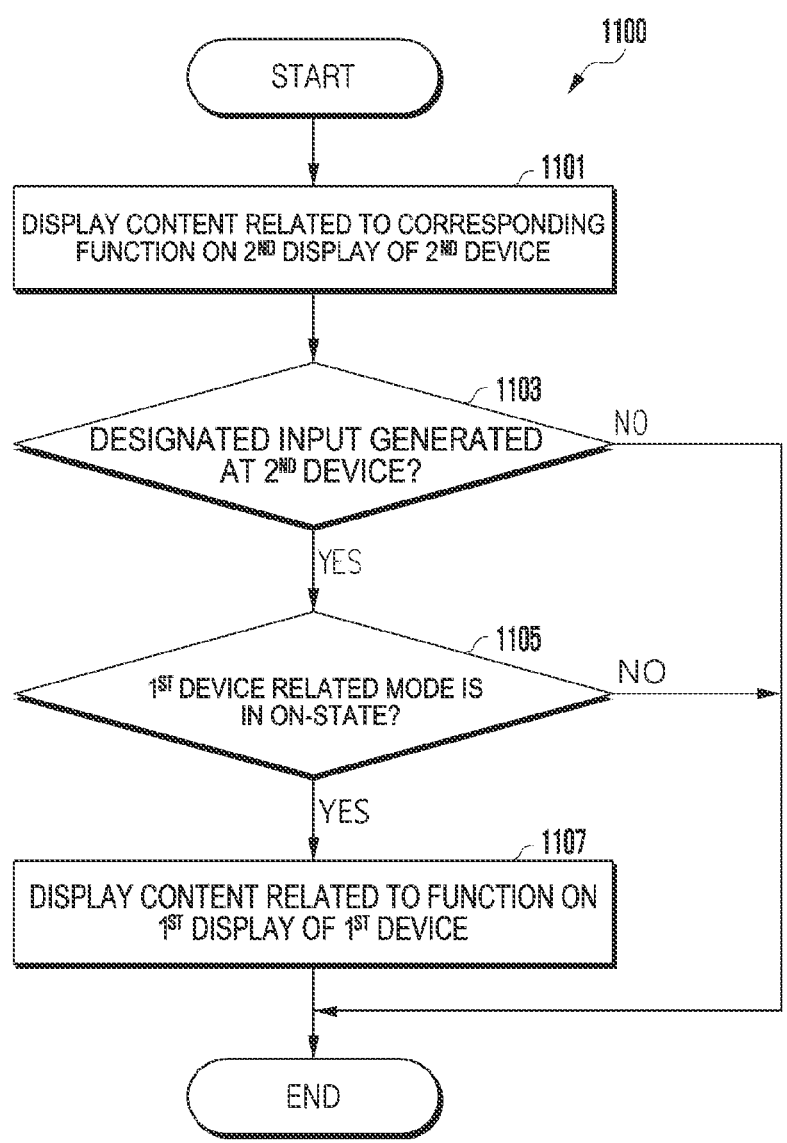
FIG. 11 illustrates an operation flow of the electronic device of FIG. 7 in a second mode, according to an embodiment.
Figure 12A:
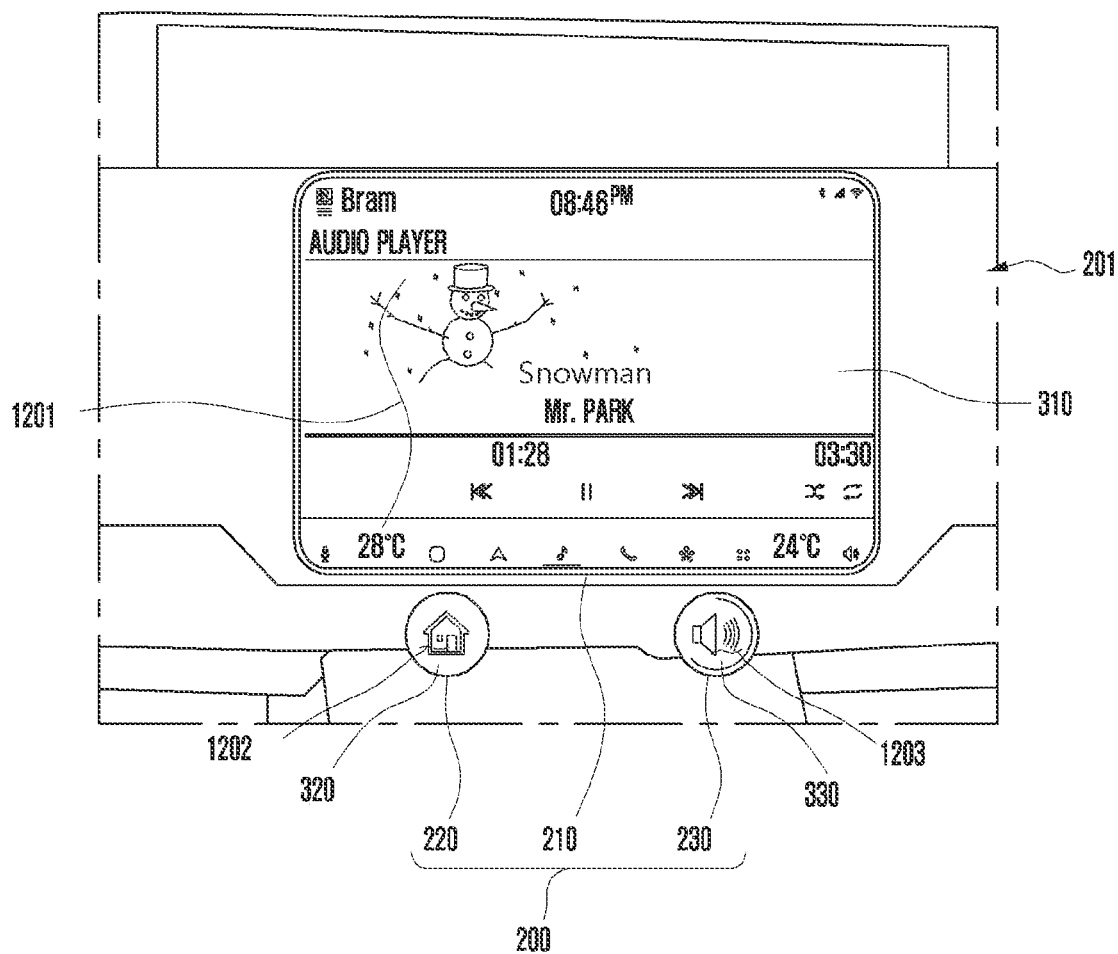
FIGS. 12A and 12B are diagrams illustrating the operation flow of FIG. 11, according to an embodiment.
Figure 12B:
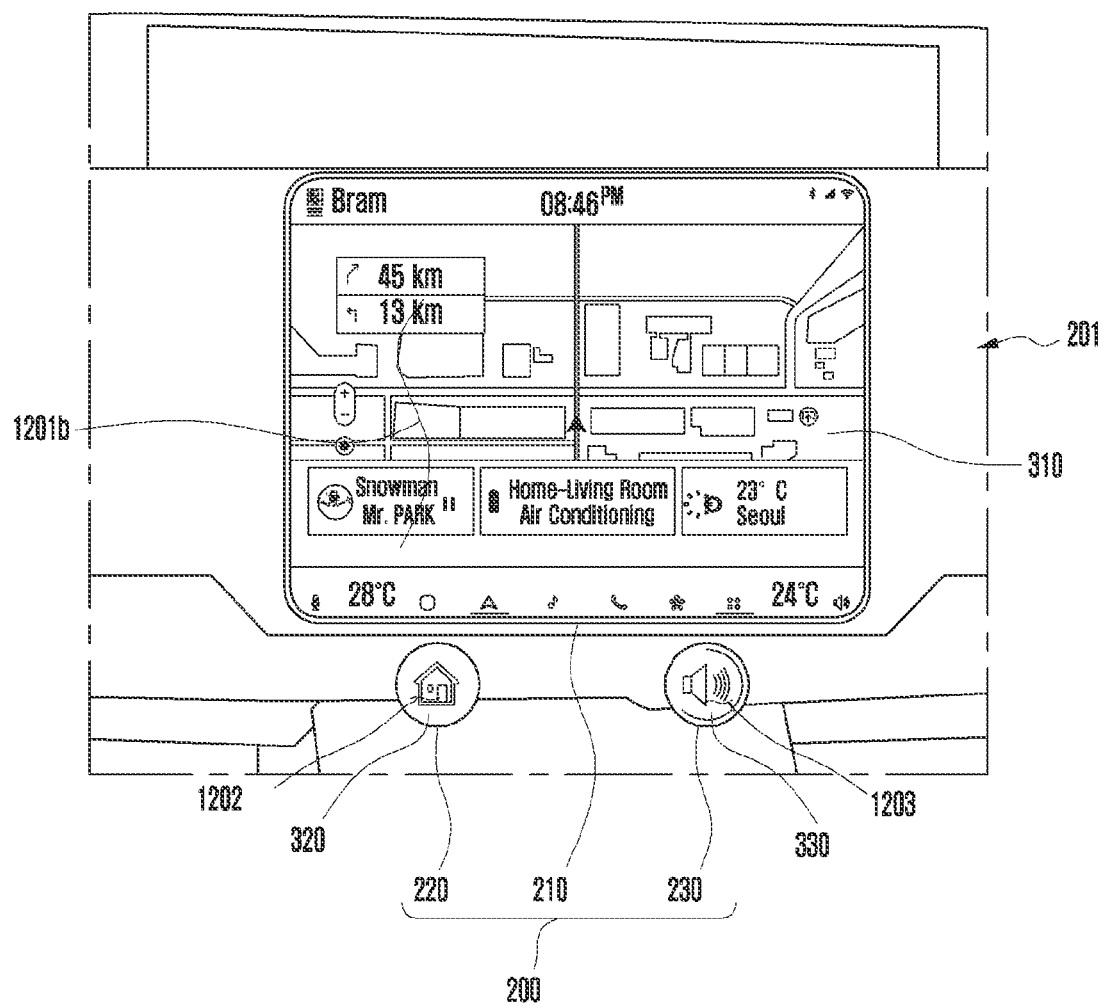

FIG. 11 illustrates an operation flow 1100 of the electronic device 200 of FIG. 7 in a second mode, according to an embodiment. FIGS. 12A and 12B are diagrams illustrating the operation flow 1100 of FIG. 11, according to an embodiment.

Referring to FIG. 11, according to an embodiment, at step 1101, the processor 710 may display content related to a corresponding function through the second display 321 of the second device 220. The content displayed through the second display 321 may include various controls related to the function. At step 1103, the processor 710 may check whether a designated input is generated at the second device 220. When the designated input occurs at the second device 220, the processor 710 may determine at step 1105 whether a mode associated with the first device 210 is in an on-state. In a certain embodiment, the designated input may be generated through the first device 210. In a certain embodiment, the designated input may be generated through an external electronic device (e.g., a vehicle or a smartphone) that is functionally or operatively connected to the electronic device 200. When it is determined at step 1105 that the associated mode with the first device 210 is in the on-state, the processor 710 may display at step 1107 content related to the function through the first display 321 of the first device 210.

Referring to FIG. 12A, for example, the electronic device 200 may provide a user interface related to an audio player through the first device 210, and first content 1201 related to the user interface may be displayed on the first display 310. The electronic device 200 may provide a user interface related to navigation through the second device 220, and second content 1202 related to the user interface may be disposed on the second display 320. The second content 1202 displayed on the second display 320 may include one of various controls related to navigation. A designated input may be generated through continuously pressing a push button included in the second input device 321 of FIG. 7 twice within a threshold time. When the designated input occurs at the second device 220, and when the mode associated with the first device 210 is in the on-state, the electronic device 200 may display content 1201b related to navigation through the first display 310 of the first device 210 as shown in FIG. 12B. Referring to FIGS. 12A and 12B, when a designated input occurs at the second device 220, the first display 310 of the first device 210 may display the content related to navigation instead of the first content related to the audio player. In a certain embodiment, the associated mode may be referred to as a mode in which displaying content related to a corresponding function is not limited to the second display 320 of the second device 220 but is expanded to the first display 310 of the first device 210. In various embodiments, the operation flow of the first and third devices 210 and 230 of FIG. 7 in the second mode may be substantially the same as that of FIG. 9. Referring to FIG. 12A, the electronic device 200 may display third content 1203 (e.g., control for volume adjustment) related to the audio player through the third display 330 of the third device 230. Although a designated input may be generated through the third device 230 while the associated mode with the first device 210 is in the on-state, the operation flow of FIG. 11 may be terminated without step 1107 because the third content 1203 displayed through the third display 330 is related to the same audio player as the first content displayed through the first display 310.

FIGS. 13A, 13B, 13C, and 13D are diagrams illustrating various operations of the electronic device 700 of FIG. 7 in a second mode, according to an embodiment.

Figure 13A:
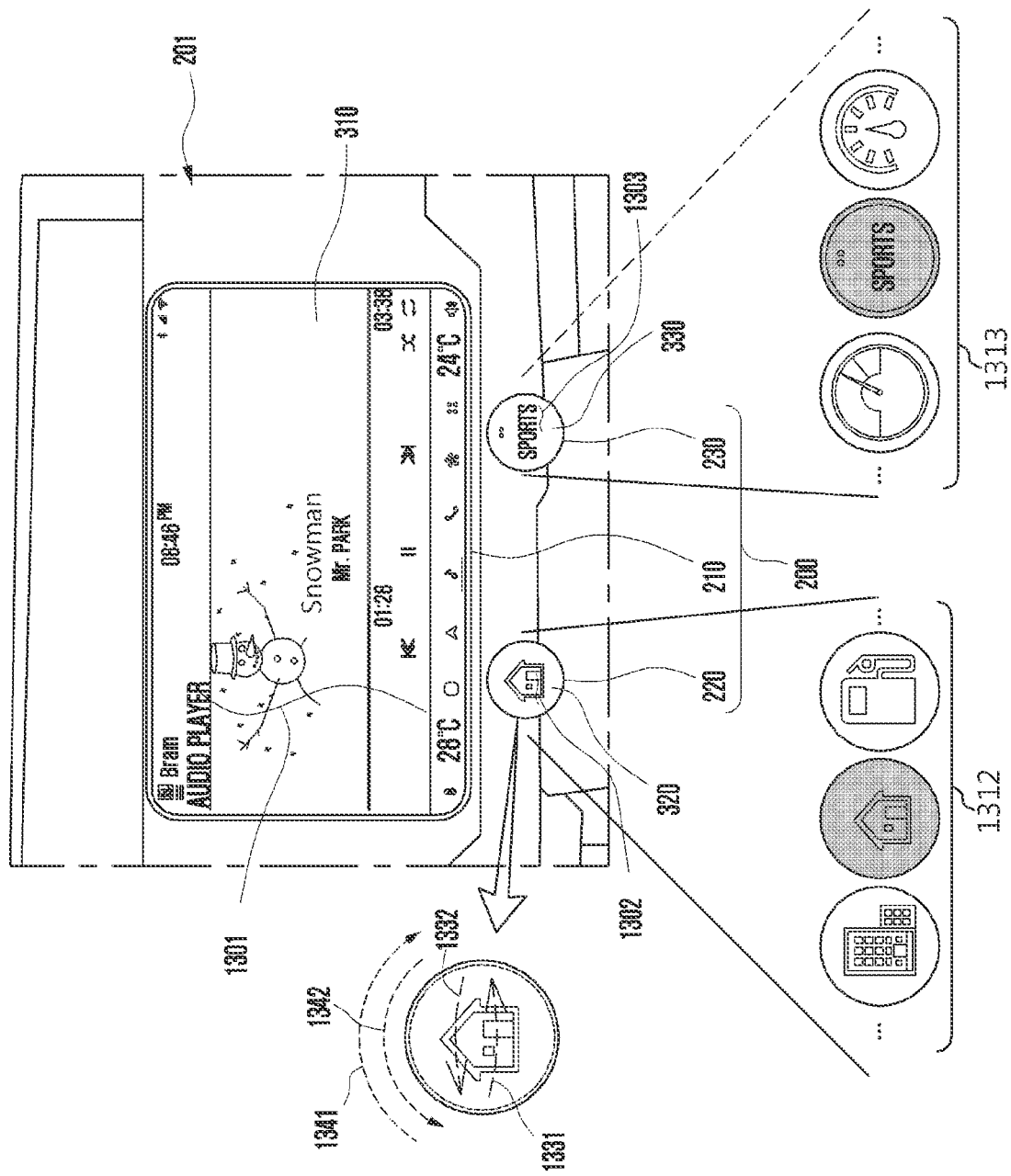
FIGS. 13A, 13B, 13C, and 13D are diagrams illustrating various operations of the electronic device of FIG. 7 in a second mode, according to an embodiment.

Referring to FIG. 13A, the electronic device 200 may provide a user interface related to an audio player through the first device 210, and first content 1301 related to the user interface may be displayed on the first display 310. In addition, the electronic device 200 may provide a user interface related to navigation through the second device 220, and second content 1302 related to the user interface may be displayed on the second display 320. The second content 1302 relates to one of various controls related to navigation, and may include a control for setting a driving destination of the vehicle 201 to "home". When a swipe gesture 1331 or 1332 is detected through a second touch sensing circuit included in the second input device 321 of the second device 220, the electronic device 200 may selectively display one of a plurality of controls 1312 related to navigation on the second display 320. For example, when a rotation input 1341 or 1342 is detected through a rotary button included in the second input device 321 of the second device 220, the electronic device 200 may selectively display one of the plurality of controls 1312 related to navigation on the second display 320. The plurality of controls 1312 may be related to various driving destinations.

Figure 13B:
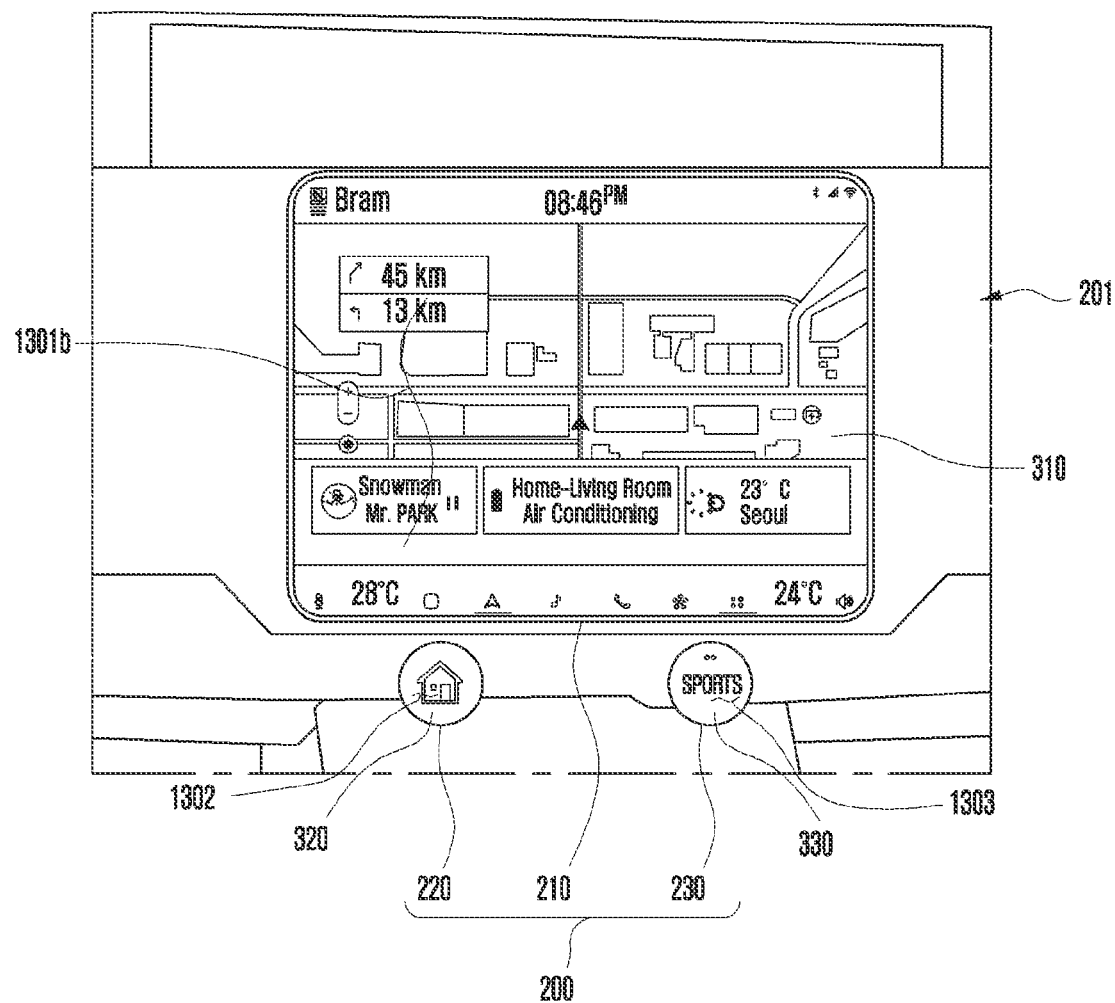

According to an embodiment, when an input of pressing a push button included in the second input device 321 of the second device 220 is detected in the embodiment of FIG. 13A, the electronic device 200 may provide a user interface related to navigation through the first device 210 as shown in the embodiment of FIG. 13B, and content 1301b related to navigation in which the driving destination is set to "home" may be displayed on the first display 310.

According to a certain embodiment, the electronic device 200 may provide a user interface related to a driving mode through the third device 230, and third content 1303 related to the user interface may be displayed on the third display 330. The third content 1303 displayed in the embodiment of FIG. 13A may include one of a plurality of controls related to the driving mode. For example, when a swipe gesture is detected through a third touch sensing circuit included in the third device 230, or when a rotation input is detected through a rotary button included in the third device 230, the electronic device 200 may selectively display one of a plurality of controls 1313 related to the driving mode on the third display 330. When an input of pressing a push button included in the third device 230 is detected in the embodiment of FIG. 13A, the electronic device 200 may request a vehicle control system (e.g., the first external electronic device 751 in FIG. 7) of the vehicle 201 to perform the driving mode corresponding to the third content 1303 displayed on the third display 330. Then, the vehicle control system of the vehicle 201 may control a suspension, a steering wheel, and/or a speed change pattern of the vehicle 201, based on the driving mode requested by the electronic device 200. In addition, the vehicle control system of the vehicle 201 may provide various driving environments by controlling various characteristics such as an engine throttle (valve) response, a shifting time of a transmission, a steering wheel response, and/or a suspension damping force, based on the driving mode requested by the electronic device 200.

Figure 13C:
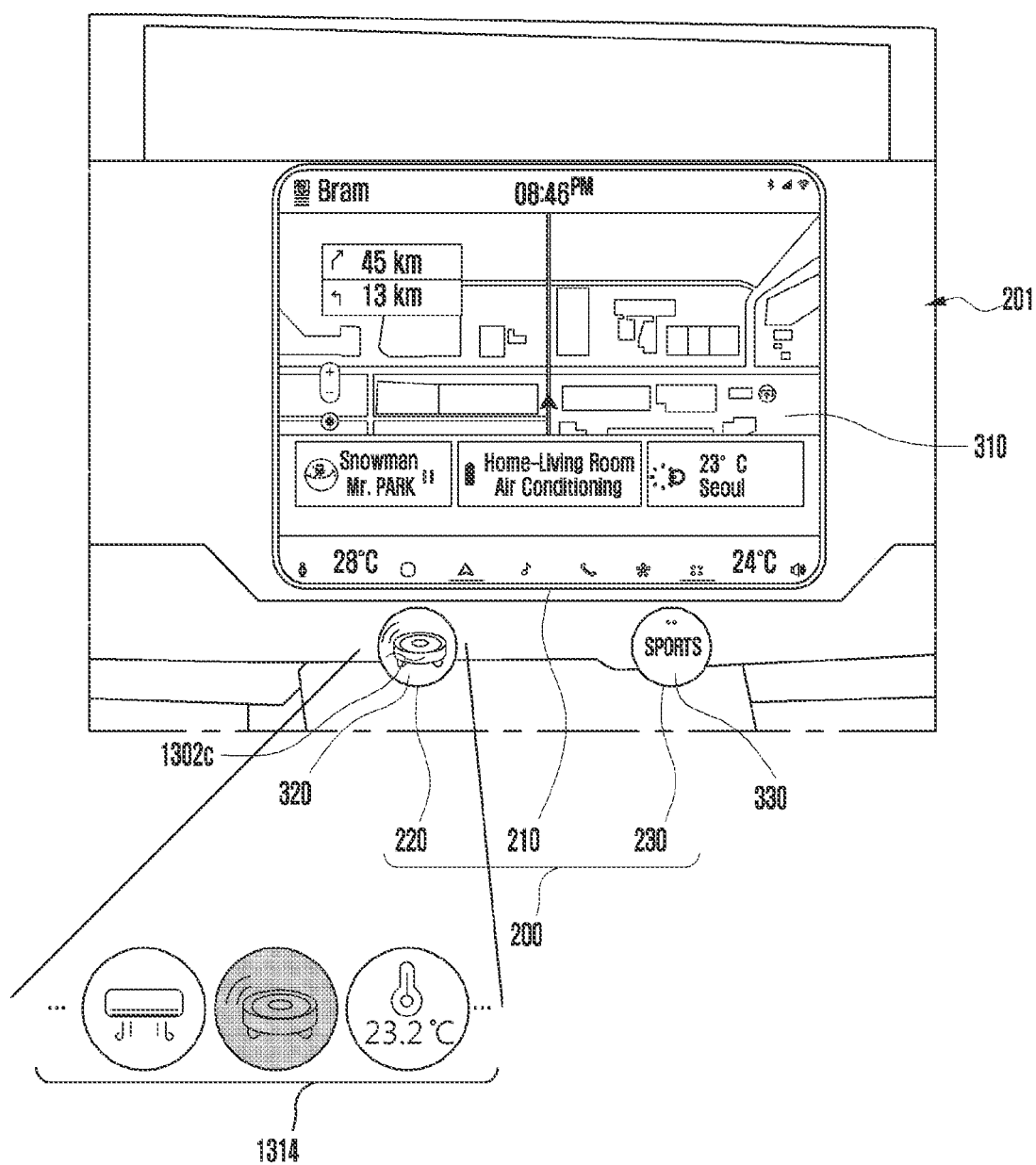
Figure 13D:
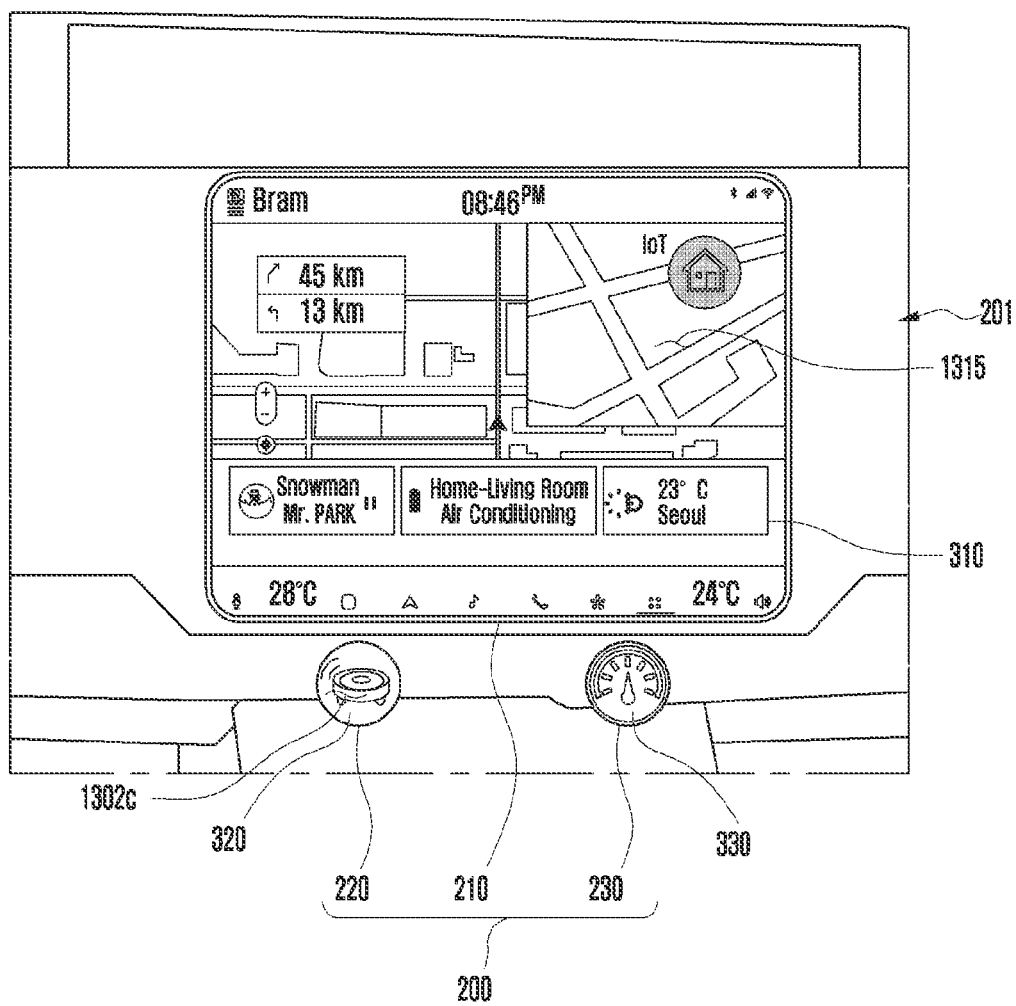

According to an embodiment, when an input of pressing a push button included in the second device 220 for a threshold time or more is detected in the embodiment of FIG. 13B, the electronic device 200 may provide a user interface related to a certain function (e.g., IoT), different from navigation, through the second device 220 as in the embodiment of FIG. 13C. Content 1302c related to the user interface may be displayed on the second display 320. In the embodiment of FIG. 13C, the content 1302c displayed through the second display 320 may include one of a plurality of controls 1314 related to home appliances allowing remote control based on IoT. When a swipe gesture is detected through a second touch sensing circuit included in the second device 220, or when a rotation input is detected through a rotary button included in the second device 220, the electronic device 200 may selectively display one of the plurality of controls 1314 on the second display 320. When an input of pressing a push button included in the third device 230 is detected in the embodiment of FIG. 13C, the electronic device 200 may provide a user interface for remote control of a home appliance (e.g., a robot cleaner) corresponding to the content 1302 displayed on the second display 320 as in the embodiment of FIG. 13D. Content 1315 related to the user interface may be displayed on the first display 310.

Figure 14:
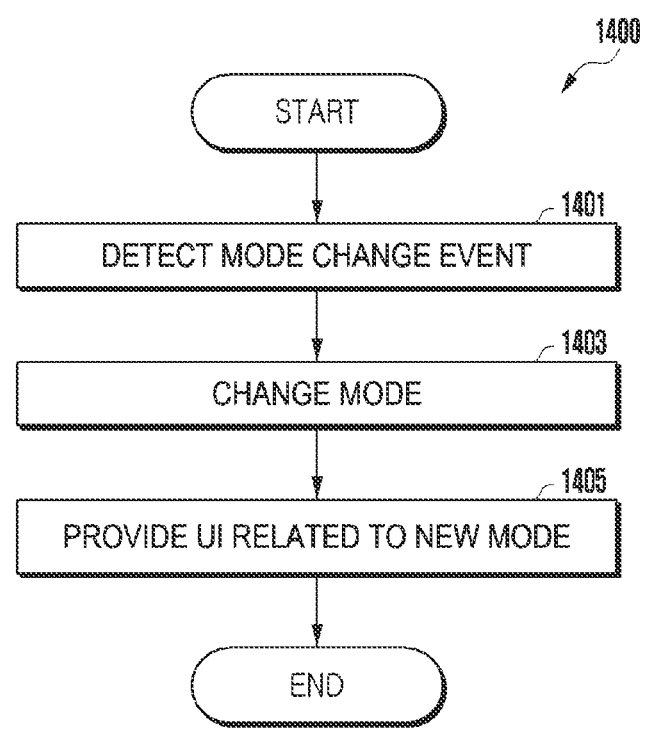
FIG. 14 illustrates an operation flow of the electronic device of FIG. 7, according to an embodiment.
Figure 15A:
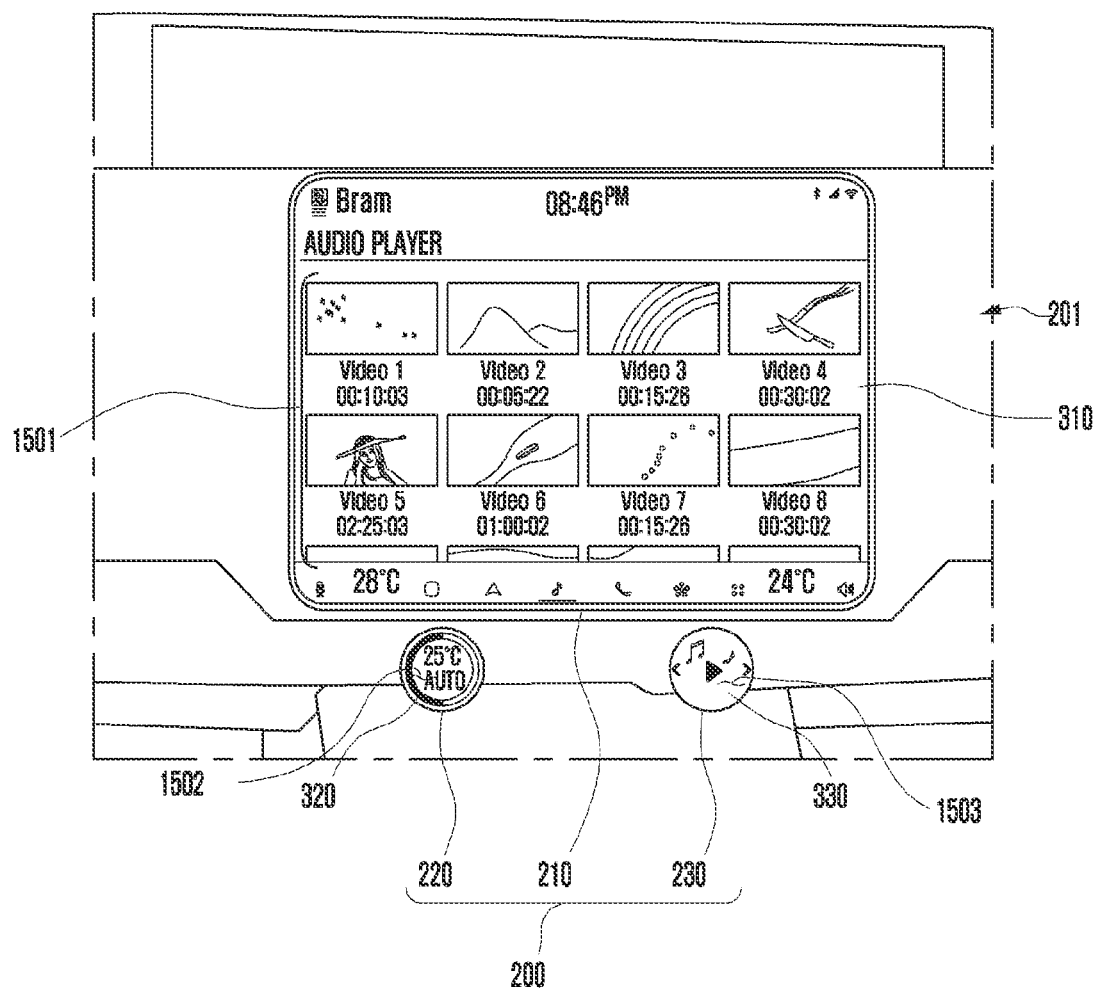
FIGS. 15A, 15B, and 15C are diagrams illustrating the operation flow of FIG. 14, according to an embodiment.
Figure 15B:
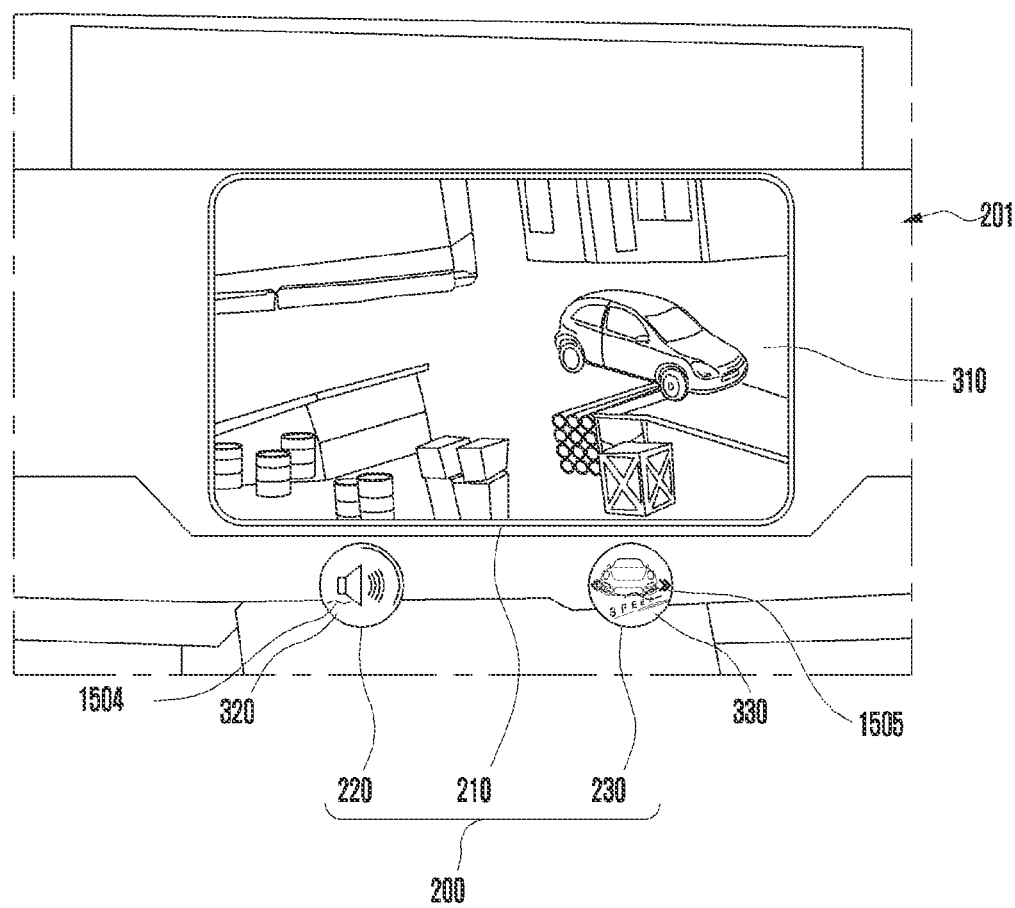
Figure 15C:
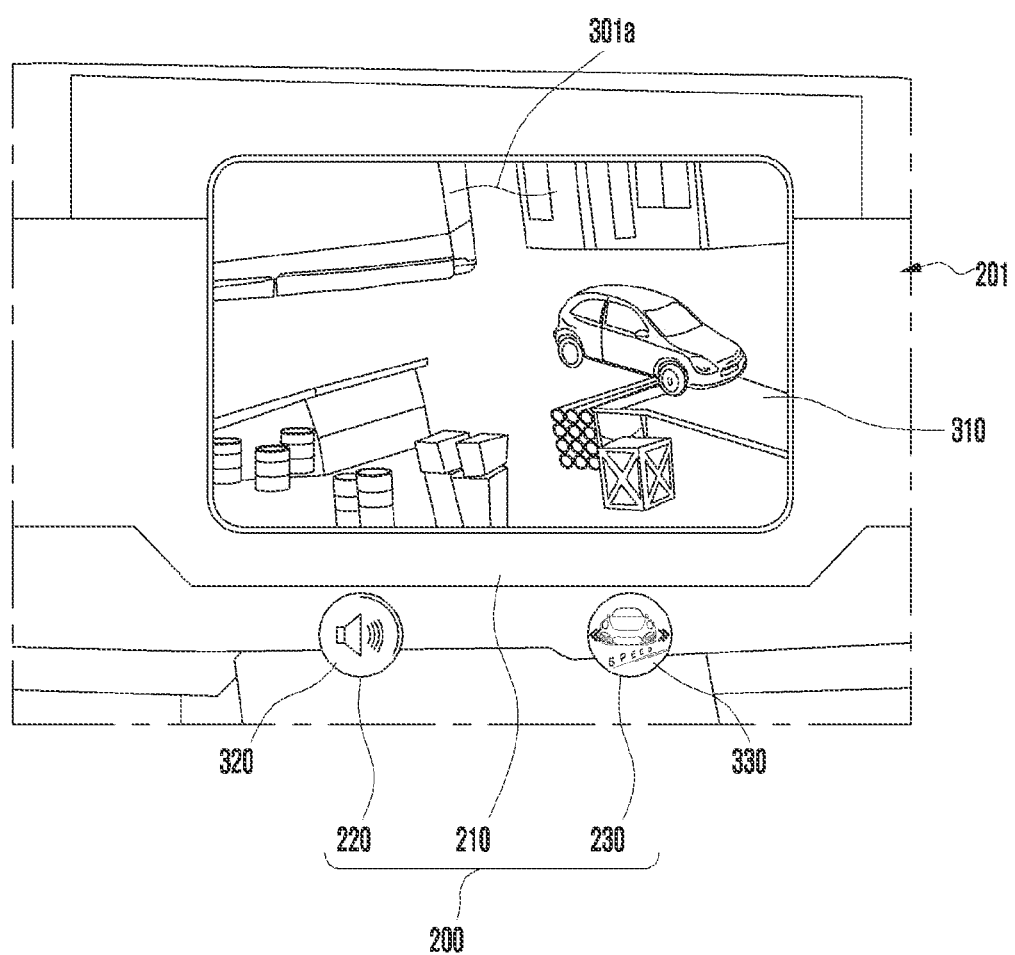

FIG. 14 illustrates an operation flow 1400 of the electronic device 200 of FIG. 7, according to an embodiment. FIGS. 15A, 15B, and 15C are diagrams illustrating the operation flow 1400 of FIG. 14, according to an embodiment.

Referring to FIG. 14, at step 1401, the processor 710 may detect a mode change event. At step 1403, the processor 710 may change the mode of the electronic device 200 by controlling the actuator 740 of FIG. 7 in response to the mode change event. The mode change event may include an event related to changing between the first mode of FIG. 3A and the second mode of FIG. 3B, or an event related to changing between the second mode of FIG. 3B and the third mode of FIG. 3C.

According to an embodiment, the mode change event may occur based on a user input. For example, a user input detected through the first input device 311 of FIG. 7 in the first mode may include an event related to changing from the first mode to the second mode. A user input detected through the first input device 311, the second input device 321, or the third input device 331 of FIG. 7 in the second mode may include an event related to changing from the second mode to the third mode or an event related to changing from the second mode to the first mode. For example, a user input detected through the first input device 311, the second input device 321, or the third input device 331 of FIG. 7 in the third mode may include an event related to changing from the third mode to the second mode or an event related to changing from the third mode to the first mode.

According to an embodiment, the mode change event may be based on content or application (or function). When video content is selected based on a user input and played back in the electronic device 200 being in the first mode or the second mode, the electronic device 200 may recognize the selection and playback of video content as the mode change event and thereby change the current mode to the third mode.

According to various embodiments, the mode change event may be based on a user profile. A first user profile for a first user account may include a preference that processes the selection and playback of video content as the mode change event, but a second user profile for a second user account may include a preference that does not process the selection and playback of video content as the mode change event.

According to various embodiments, the mode change event may be based on various operations of the vehicle 201 of FIG. 2. When video content is selected and played based on a user input in the first mode or the second mode, and when autonomous driving of the vehicle 201 is identified, the electronic device 200 may recognize this as the mode change event and thereby change the current mode to the third mode.

According to an embodiment, at step 1405, the processor 710 may provide a user interface related to a new changed mode. For example, when changing from the first mode to the second mode, an environment in which the user can additionally utilize the second device 220 or the third device 230 is created, and the processor 710 may provide a user interface in consideration of this environment. The user interface may be implemented in various ways according to an application (or function), based on the first mode, the second mode, or the third mode.

Referring to FIG. 15A, the electronic device 200 in the second mode may provide a user interface related to a video player through the first device 210, and first content 1501 related to the user interface may be displayed on the first display 310. For example, the electronic device 200 in the second mode may provide a user interface related to an air conditioning function of the vehicle 201 through the second device 220, and second content 1502 related to the user interface may be displayed on the second display 320. For example, the electronic device 200 in the third mode may provide a user interface related to an audio player through the third device 230, and third content 1503 related to the user interface may be displayed on the third display 330.

According to an embodiment, in the embodiment of FIG. 15A, one of items included in the first content 1501 may be selected based on a user input. Referring to FIGS. 15A and 15B, the electronic device 200 may change from the second mode (FIG. 15B or FIG. 6B) to the third mode (FIG. 15C or FIG. 4B) while playing video content corresponding to the selected item through the first display 310. Because of a tilted angle of the first surface 301a in the third mode, the driver may feel visual comfort in the third mode rather than the second mode when viewing the first display 310. When one of the items 1501 related to video content is selected based on a user input in the embodiment of FIG. 15A, the electronic device 200 may display content 1504 including a first control related to a video player through the second display 320 as in the embodiment of FIG. 15B. When one of the items 1501 related to video content is selected based on a user input in the embodiment of FIG. 15A, the electronic device 200 may display content 1505 corresponding to a second control related to a video player through the third display 330 as in the embodiment of FIG. 15B. The first control and the second control may be different from each other.

Figure 16:
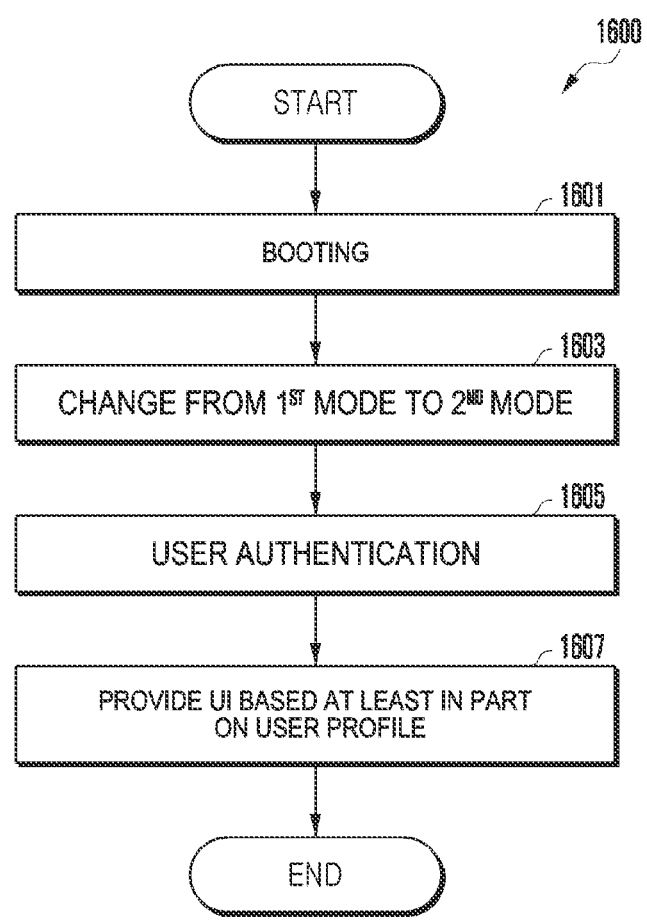
FIG. 16 illustrates an operation flow of the electronic device of FIG. 7, according to an embodiment.

FIG. 16 illustrates an operation flow 1600 of the electronic device 200 of FIG. 7, according to an embodiment. FIGS. 17A, 17B, 17C, and 17D are diagrams illustrating the operation flow 1600 of FIG. 16, according to an embodiment.

Figure 17A:
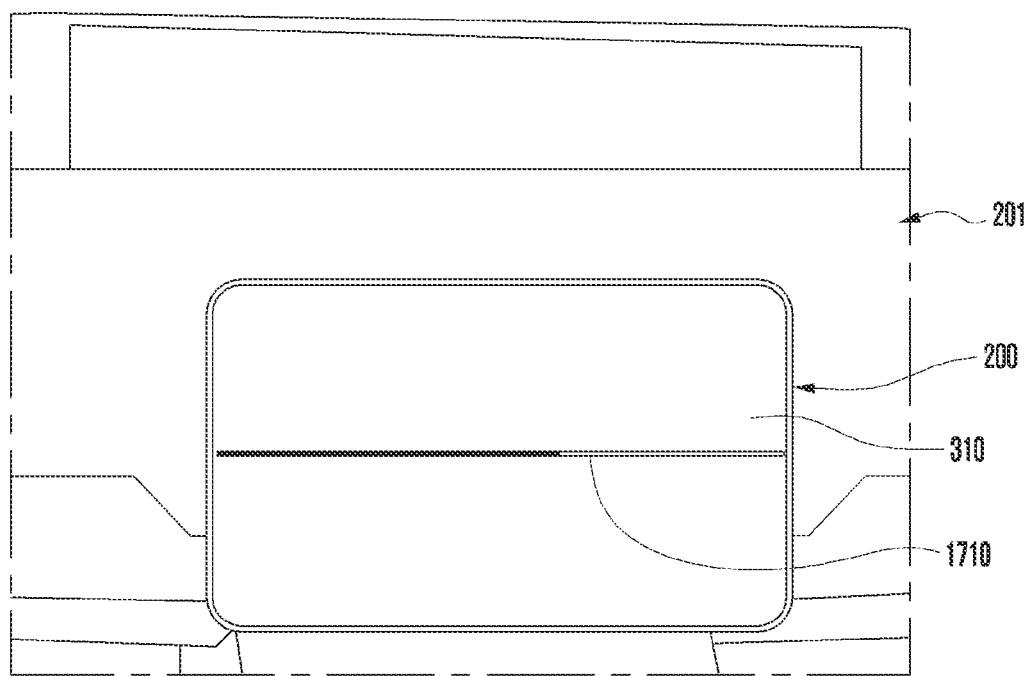
FIGS. 17A, 17B, 17C, and 17D are diagrams illustrating the operation flow of FIG. 16, according to an embodiment.

Referring to FIG. 16, according to an embodiment, at step 1601, the processor 710 may perform booting of the electronic device 200. When a power-on signal is detected, the electronic device 200 may be turned on and booted. The power-on signal may be transmitted from the vehicle control system of the vehicle 201 of FIG. 2. Referring to FIG. 17A, when the vehicle 201 is started and is in a driving state, most of electronic devices in the vehicle 201 may be powered on. When the electronic device 200 is powered on, the processor 710 may read the OS stored in the memory 720 and perform booting to use the OS. Through booting, the processor 710 may start up or initially set the in-vehicle infotainment system of the electronic device 200. During booting, the processor 710 may display a booting-related image 1710 (e.g., a booting animation) through the first display 310 of the electronic device 200 in the first mode. In a certain embodiment, in an accessory (ACC) mode of the vehicle 201, the electronic device 200 may be turned on. The ACC mode may indicate, for example, a state in which some electronic devices in the vehicle 201 can be used without starting the vehicle 201.

Figure 17B:
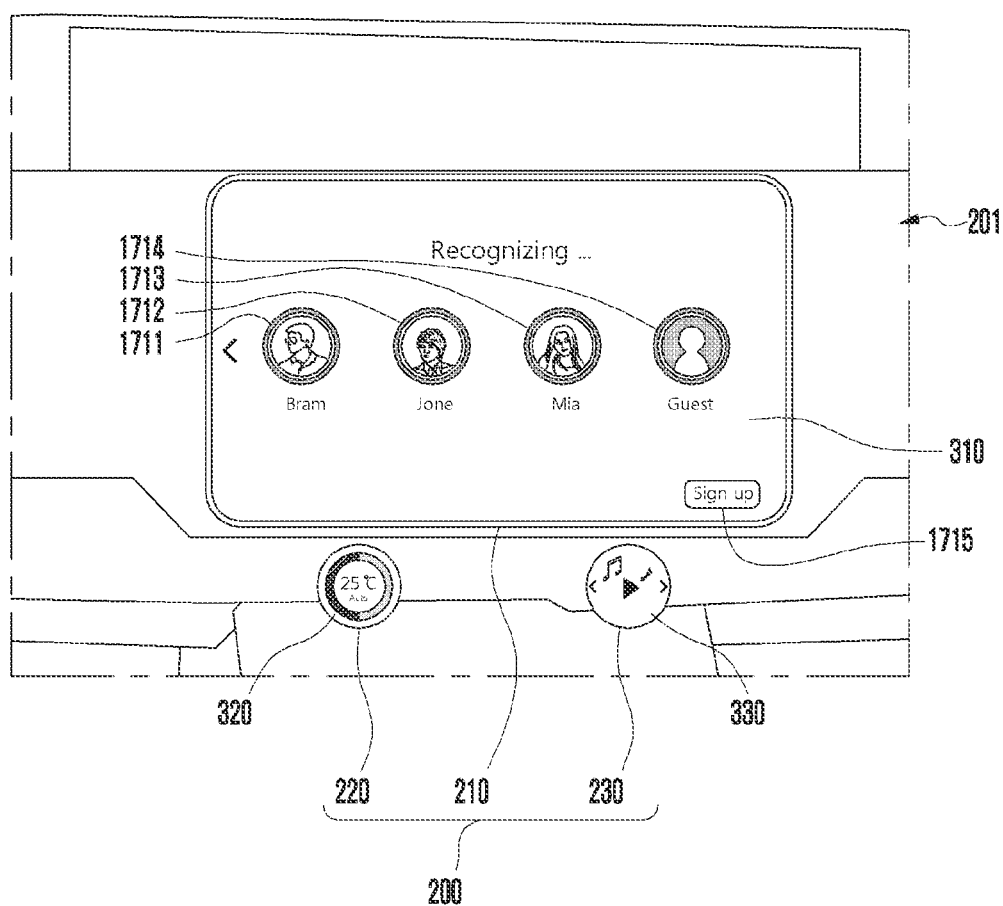

Referring to FIG. 16, according to an embodiment, at step 1603, the processor 710 may change the electronic device 200 from the first mode to the second mode by controlling the actuator 740. Referring to FIG. 17B, in the second mode, the first device 210 may be positioned so as not to cover the second device 220 and the third device 230. For example, Booting of the step 1601 may include a mode change event.

Referring to FIG. 16, according to an embodiment, at step 1605, the processor 710 may perform user authentication. The user authentication may refer to a procedure for identifying the access qualification of a person who accesses the system of the electronic device 200. Referring to FIG. 17B, the processor 710 may display items 1711, 1712, and 1713 indicating registered users through the first display 310. As shown, the items 1711, 1712, and 1713 may include personal information, such as a picture or text, about a user included in a user profile. When one of the items 1711, 1712, and 1713 is selected based on a user input, the processor 710 may query a user corresponding to the selected item as to information necessary for login (e.g., password for a user account). If the user successfully replies to this query, the user authentication may be completed. The processor 710 may provide a user interface for user authentication, and interaction between the electronic device 200 and a user may be made through the user interface.

Figure 17C:
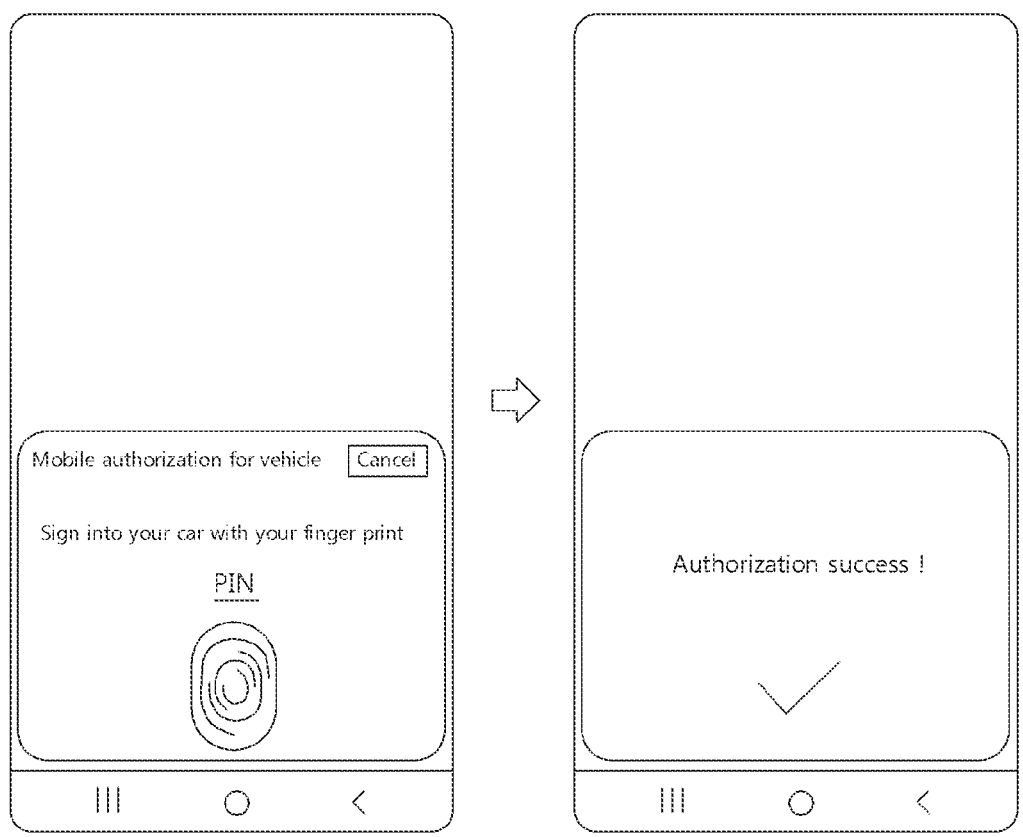

According to an embodiment, the user authentication may be performed through an external electronic device that is functionally or operatively connected to the electronic device 200. Referring to FIG. 17C, an external electronic device (e.g., the second external electronic device 752 in FIG. 7) that is communicatively connected to the electronic device 200 may provide a user interface, such as fingerprint recognition or personal identification number (PIN), for user authentication to the user, and the user authentication may be performed based on a user input through the user interface.

According to various embodiments, the user authentication may be performed through various kinds of biometric recognition other than the fingerprint recognition. The user authentication may include iris recognition or face recognition using a camera included in the electronic device 200, the vehicle 201, or an external electronic device such as a smartphone. Any other biometric recognition may be implemented for user authentication.

According to some embodiments, step 1603 may be performed after user authentication of step 1605. When user authentication is successful, the processor 710 may change the electronic device 200 from the first mode to the second mode.

According to a certain embodiment, the operation flow of FIG. 16 may further include an operation related to user registration. Referring to FIG. 17B, a "sign up" icon 1715 may be displayed on the first display 310. When the "sign up" icon 1715 is selected based on a user input, the processor 710 may acquire a user profile including various personal data through interaction with the user, and add a new user account based on the acquired user profile to the memory 720 of FIG. 7. Any other user interface related to user registration may be implemented in various other ways.

According to a certain embodiment, the operation flow of FIG. 16 may further include an operation of allowing a user to limitedly access resources of the electronic device 200 without user authentication. Referring to FIG. 17B, a "guest" item 1714 may be displayed on the first display 310. When the "guest" item 1714 is selected based on a user input, a user interface related to corresponding functions may be executed.

According to an embodiment, at step 1607, the processor 710 may provide a user interface based on at least in part a stored or updated user profile for a user account for which user authentication has succeeded. When one item 1711 is selected from among items 1711, 1712, and 1713 indicating registered users in the embodiment of FIG. 17B and the user authentication is successful, a user interface based on at least in part a user profile stored in a user account with user authentication passed may be provided through the first device 210 as in the embodiment of FIG. 17D. Various contents related to the user interface may be displayed on the first display 310.

Figure 17D:
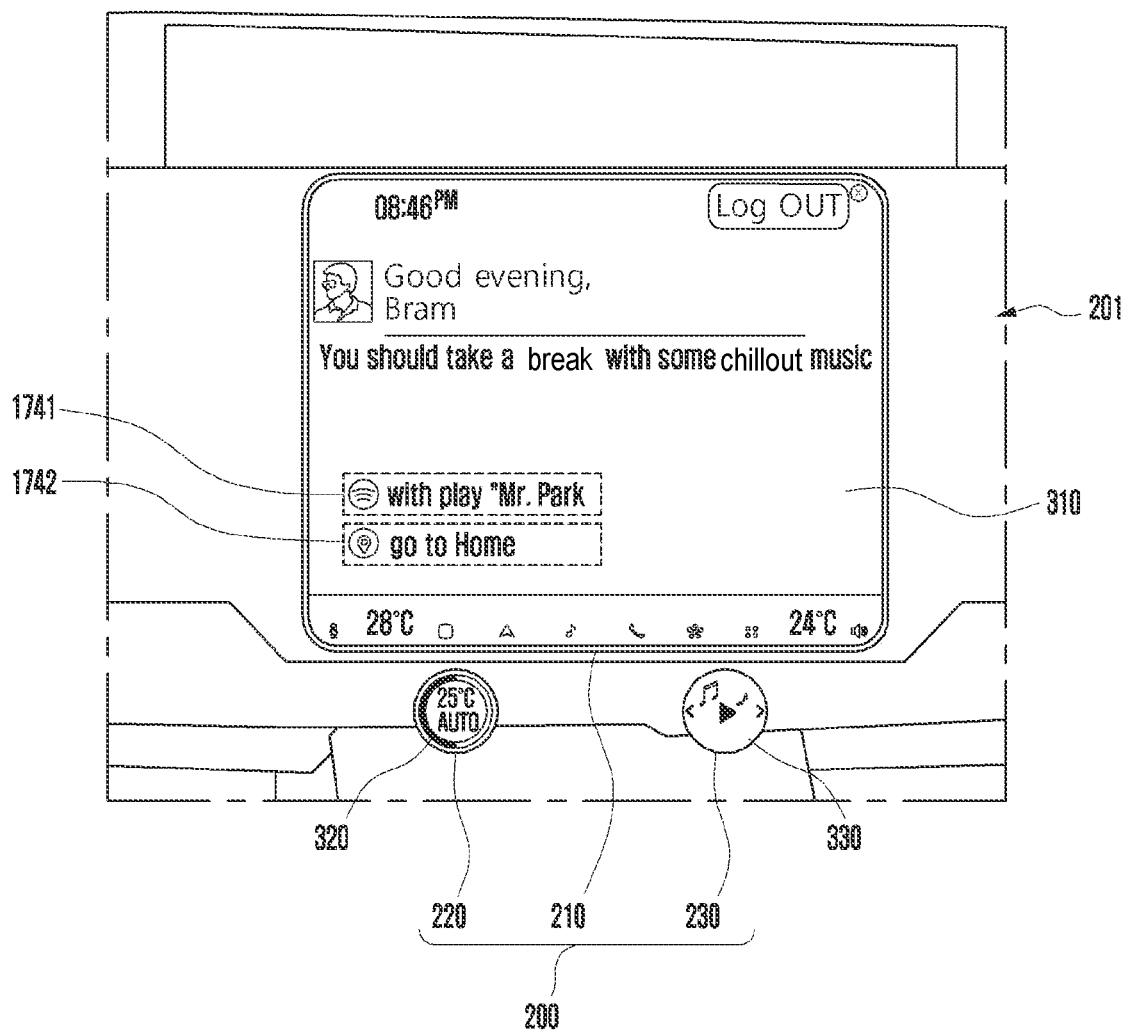

According to various embodiments, contents displayed on the first display 310, the second display 320, or the third display 330 through a user interface based on a user profile may be referred to as a personal page. In the embodiment of FIG. 17D, the personal page displayed on the first display 310 may include various recommendations 1741 and 1742 provided in consideration of personal characteristics or preferences. The personal page may be implemented based on a usage history such as a usage time or selection frequency for content or application.

According to various embodiments, after the operation flow 1600 of FIG. 16, the electronic device 200 may perform the operation flow 900 of FIG. 9, the operation flow 1100 of FIG. 11, the operation flow 1400 of FIG. 14, or the operation flow described with reference to FIGS. 13A to 13D.

Figure 18:
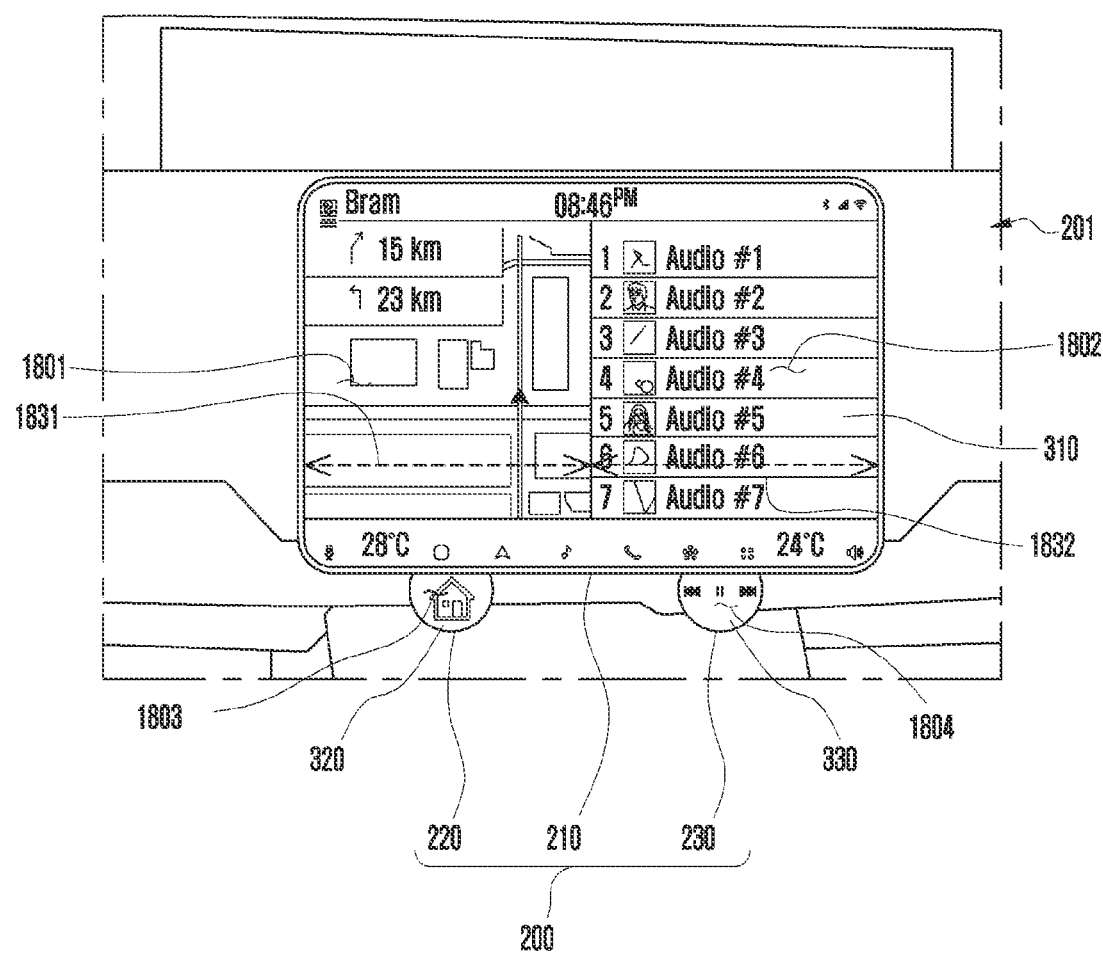
FIGS. 18, 19, and 20 illustrate a fourth mode of the electronic device, according to an embodiment.
Figure 19:
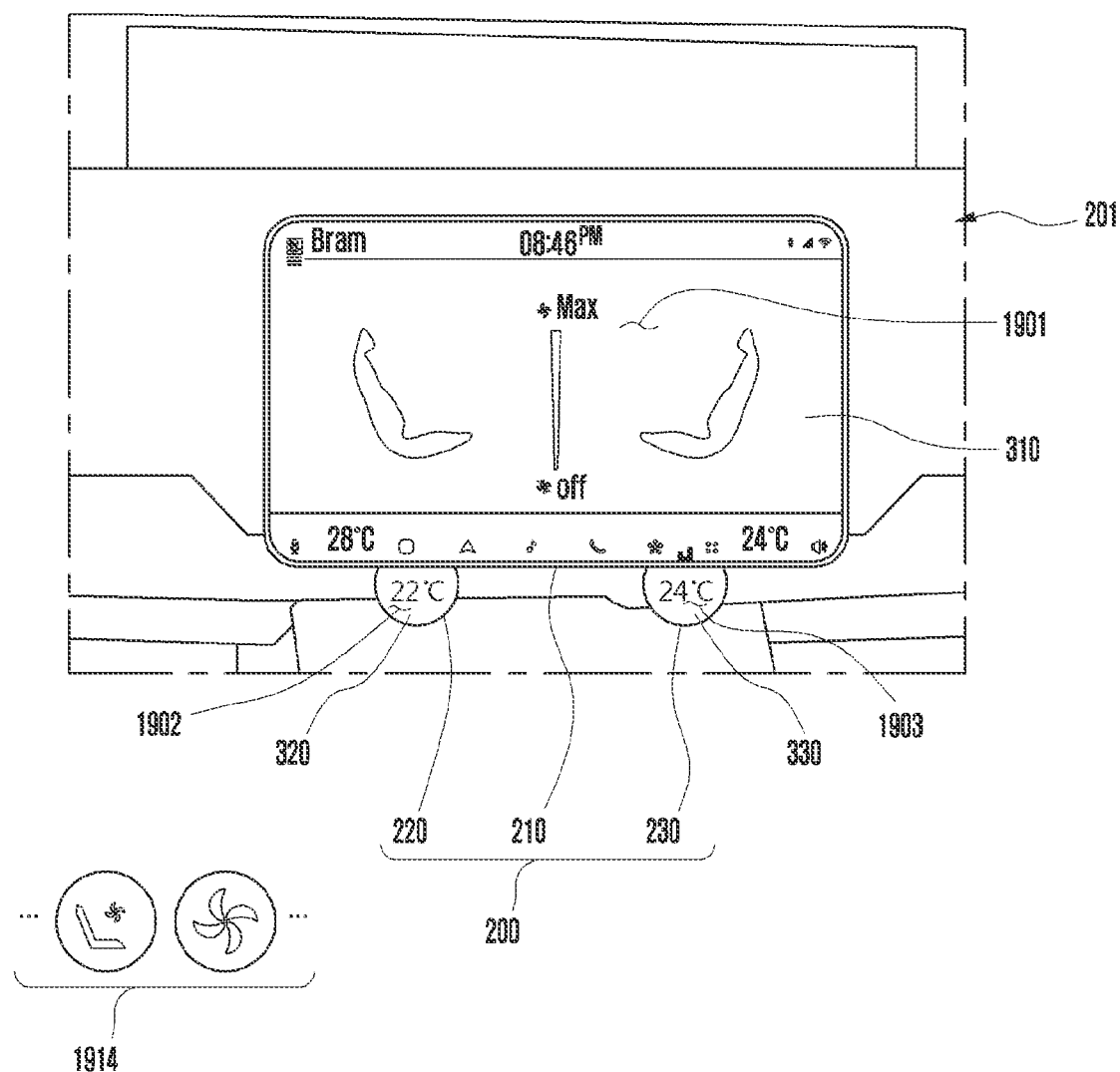
Figure 20:
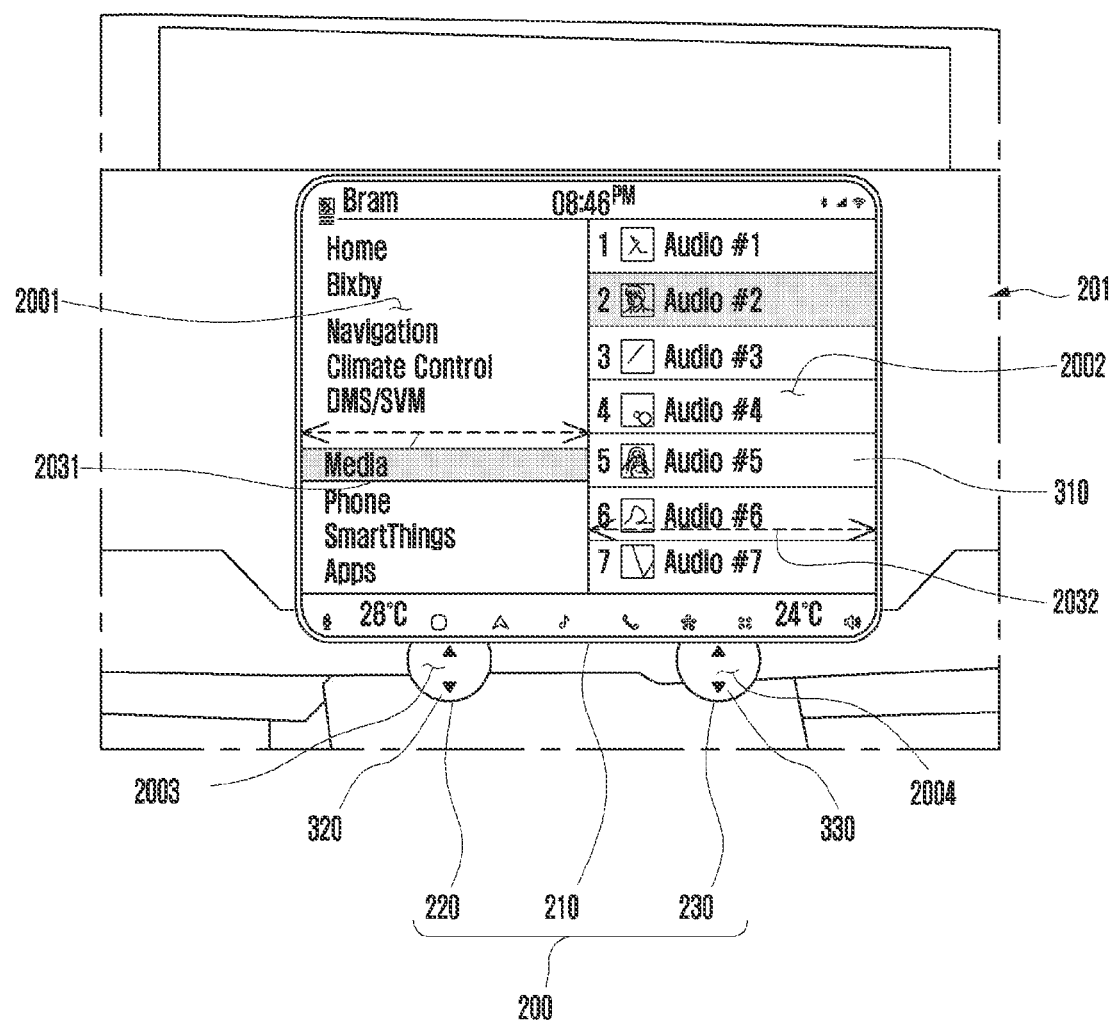

FIGS. 18, 19, and 20 illustrate a fourth mode (or a fourth state) of the electronic device 200, according to an embodiment.

Referring to FIGS. 18, 19, and 20, the electronic device 200 may be in the fourth mode between the first mode of FIG. 3A and the second mode of FIG. 3B. In the fourth mode, the first device 210 may be positioned to partially cover the second device 220 and the third device 230. In the fourth mode, a portion of the second display 320 of the second device 220 and a portion of the third display 330 of the third device 230 may be covered with the first device 210. In the fourth mode, the covered portion of the second display 320 and the covered portion of the third display 330 may be disabled.

Referring to FIG. 18, in an embodiment, the electronic device 200 may display first content 1801 through a first portion 1831 of the first display 310, and also display second content 1802 through a second portion 1832 of the first display 310. The first portion 1831 may be positioned near the second display 320, and the second portion 1832 may be positioned near the third display 330. The electronic device 200 may display third content 1803 through the second display 320, and also display fourth content 1804 through the third display 330. The first and third contents 1801 and 1803 may be related to a first function (e.g., navigation), and the second and fourth contents 1802 and 1804 may be related to a second function (e.g., an audio player) different from the first function.

Referring to FIG. 19, in an embodiment, the electronic device 200 being in the fourth mode may display first content 1901 through the first display 310. Also, the electronic device 200 may display second content 1902 through the second display 320 and display third content 1903 through the third display 330. The first content 1901 may be related to a first function (e.g., an air conditioning function of a vehicle), and the second content 1902 or the third content 1902 may be related to a second function (e.g., a seat temperature control function) associated at least in part with the first function.

According to various embodiments, the second content 1902 displayed through the second display 320 or the third content 1903 displayed through the third display 330 may include one of a plurality of controls 1914 associated with the air conditioning function of the vehicle. When a swipe gesture is detected through a second touch sensing circuit included in the second device 220, or when a rotation input is detected through a rotary button included in the second device 220, the electronic device 200 may selectively display one of the plurality of controls 1914 on the second display 320. When a swipe gesture is detected through a third touch sensing circuit included in the third device 230, or when a rotation input is detected through a rotary button included in the third device 230, the electronic device 200 may selectively display one of the plurality of controls 1914 on the second display 320. The second content 1902 or the third content 1902 may be provided in connection with various other functions related to the vehicle 201 of FIG. 2.

Referring to FIG. 20, in an embodiment, the electronic device 200 may display first content 2001 through a first portion 2031 of the first display 310, and also display second content 2002 through a second portion 2032 of the first display 310. The first portion 2031 may be located near the second display 320, and the second portion 2032 may be located near the third display 330. The electronic device 200 may display third content 2003 through the second display 320, and also display fourth content 2004 through the third display 330. The first content 2001 may include, for example, items related to applications. The third content 2003 may include, for example, a control for selecting one of the items of the first content 2001. When a touch input is detected on the third content 2003 through a second touch sensing circuit included in the second device 220, or when a rotation input is detected through a rotary button included in the second device 220, the electronic device 200 may display a selection on one item (e.g., a "Media" item) in the first content 2001. In addition, the electronic device 200 may display sub-items for the selected and displayed item as the second content 2002. For example, the second content 2002 may include items related to audio data. The fourth content 2004 may include, for example, a control for selecting one of the items of the second content 2002. When a touch input is detected on the second content 2004 through a third touch sensing circuit included in the third device 230, or when a rotation input is detected through a rotary button included in the third device 230, the electronic device 200 may display a selection on one item (e.g., "Audio #2" item) in the second content 2002. When a press input is detected through a push button included in the third device 230, the electronic device 200 may reproduce audio data corresponding to the selected and displayed item.

According to embodiments of FIGS. 18, 19, and 20, in the fourth mode of the electronic device 200, it is possible to control desired functions through the second device 220 or the third device 230 instead of the first device 210. This enables the driver to use the second device 220 and the third device 230, which are easier to manipulate than the first device 210, thereby contributing to the driver's safety while driving.

According to an embodiment, an electronic device may include a first device including a first housing having a first surface and a second surface facing opposite to the first surface, and a first display disposed in the first housing and visually exposed through the first surface. The electronic device may further include a second device including a second housing having a third surface, and a second display disposed in the second housing and visually exposed through the third surface. The electronic device may further include an assembly connecting the first device and the second device. The electronic device may further include a processor operatively connected to the first device, the second device, and the assembly, and a memory electrically connected to the processor. The memory may store instructions that, when executed, cause the processor to control the assembly so that the second surface faces the third surface and covers the second display in a first mode, and to control the assembly so that the second surface does not cover the second display in a second mode.

The first surface and the third surface may face in a same direction in the second mode.

The instructions, when executed, may further cause the processor to control the assembly so that the second surface and the third surface form an acute angle while the second surface does not cover the second display in a third mode.

The instructions, when executed, may further cause the processor to control the assembly in the second mode or the third mode so that the second device protrudes in a direction where the third surface faces.

The instructions, when executed, may further cause the processor to select the first mode, the second mode, or the third mode, based on an executed application.

The instructions, when executed, may further cause the processor to select the first mode, the second mode, or the third mode, based at least in part on a user profile.

The instructions, when executed, may further cause the processor to select the first mode, the second mode, or the third mode, based at least in part on a user input received from the first device, the second device, or an external electronic device.

The instructions, when executed, may further cause the processor to, when a corresponding function is executed in the second mode, display a first content related to the function through the first display, and display a second content related to the function through the second display.

The instructions, when executed, may further cause the processor to, in the second mode, display a first content related to a first function through the first display, and display a second content related to a second function different from the first function through the second display.

The instructions, when executed, may further cause the processor to control the second display in the second mode, based at least in part on a user input detected through the first device.

The instructions, when executed, may further cause the processor to control the first display in the second mode, based at least in part on a user input detected through the second device.

The instructions, when executed, may further cause the processor to control the first display and the second display in the second mode, based at least in part on a user input detected through the first device.

The instructions, when executed, may further cause the processor to control the first display and the second display in the second mode, based at least in part on a user input detected through the second device.

The second device may further include an input device for generating an input signal in response to a pressing manipulation or a rotating manipulation on the second housing.

The second display may further include a touch sensing circuit.

The instructions, when executed, may further cause the processor to select the second mode after booting of the electronic device.

The instructions, when executed, may further cause the processor to control the assembly so that the second surface faces the third surface and covers a part of the second display in a fourth mode.

The instructions, when executed, may further cause the processor to, when a corresponding function is executed in the fourth mode, display a first content related to the function through the first display, and display a second content related to the function through the second display.

The electronic device may be located in a vehicle and may be operatively connected to the vehicle.

The instructions, when executed, may further cause the processor to display a control related to the vehicle through the second display in the second mode.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
a first device including a first housing having a first surface and a second surface facing opposite to the first surface, and a first display disposed in the first housing to be viewed through the first surface;
a second device including a second housing having a third surface, and a second display disposed in the second housing to be viewed through the third surface;
an assembly connecting the first device and the second device;
a processor operatively connected to the first device, the second device, and the assembly; and
a non-transitory memory electrically connected to the processor,
wherein the memory stores instructions that, when executed, cause the processor to:
control the assembly so that the second surface faces the third surface and covers the second display in a first state,
control the assembly so that the second surface does not cover the second display in a second state,
control the assembly so that the second device moves in a first direction that the third surface faces when the electronic device is changed from the first state to the second state, and
control the assembly so that the second device moves in a second direction opposite to the first direction when the electronic device is changed from the second state to the first state.

2. The electronic device of claim 1, wherein the first surface and the third surface face in a same direction in the second state.

3. The electronic device of claim 1, wherein the instructions, when executed, further cause the processor to:
control the assembly so that the second surface and the third surface form a first angle while the second surface does not cover the second display when the electronic device is changed from the second state to a third state,
wherein the second surface and the third surface form a second angle different than the first angle in the first state or the second state.

4. The electronic device of claim 3, wherein the instructions, when executed, further cause the processor to:
select the first state, the second state, or the third state, based on an executed application.

5. The electronic device of claim 3, wherein the instructions, when executed, further cause the processor to:
select the first state, the second state, or the third state, based on at least in part a user profile.

6. The electronic device of claim 3, wherein the instructions, when executed, further cause the processor to:
select the first state, the second state, or the third state, based at least in part on a user input received from the first device, the second device, or an external electronic device.

7. The electronic device of claim 1, wherein the instructions, when executed, further cause the processor to:
when a corresponding function is executed in the second state, display a first content related to the function through the first display, and display a second content related to the function through the second display.

8. The electronic device of claim 1, wherein the instructions, when executed, further cause the processor to:
in the second state, display a first content related to a first function through the first display, and display a second content related to a second function different from the first function through the second display.

9. The electronic device of claim 1, wherein the instructions, when executed, further cause the processor to:
control the second display in the second state, based at least in part on a user input detected through the first device.

10. The electronic device of claim 1, wherein the instructions, when executed, further cause the processor to:
control the first display in the second state, based at least in part on a user input detected through the second device.

11. The electronic device of claim 1, wherein the instructions, when executed, further cause the processor to:
control the first display and the second display in the second state, based at least in part on a user input detected through the first device.

12. The electronic device of claim 1, wherein the instructions, when executed, further cause the processor to:
control the first display and the second display in the second state, based at least in part on a user input detected through the second device.

13. The electronic device of claim 1, wherein the second device further includes an input device for generating an input signal in response to a pressing manipulation or a rotating manipulation on the second housing.

14. The electronic device of claim 13, wherein the second display further includes a touch sensing circuit.

15. The electronic device of claim 1, wherein the instructions, when executed, further cause the processor to:
select the second state after booting of the electronic device.

16. The electronic device of claim 15, wherein the instructions, when executed, further cause the processor to:
control the assembly so that the second surface faces the third surface and covers a part of the second display in a fourth state.

17. The electronic device of claim 16, wherein the instructions, when executed, further cause the processor to:
when a corresponding function is executed in the fourth state, display a first content related to the function through the first display, and display a second content related to the function through the second display.

18. The electronic device of claim 1, wherein the electronic device is located in a vehicle and is operatively connected to the vehicle.

19. The electronic device of claim 18, wherein the instructions, when executed, further cause the processor to:
display a control related to the vehicle through the second display in the second state.

20. The electronic device of claim 1, further comprising a third housing coupled to the assembly,
wherein the second device is disposed in the third housing,
wherein the second device is protruded through an opening of the third housing in the second state, and
wherein the second device is not protruded through the opening of the third housing in the first state.

* * * * *